(12) United States Patent
Kim et al.

(10) Patent No.: US 8,810,745 B2
(45) Date of Patent: Aug. 19, 2014

(54) LIQUID CRYSTAL DISPLAY

(75) Inventors: Hoon Kim, Ansan-si (KR); Ki Chul Shin, Asan-si (KR); Su Jeong Kim, Seoul (KR); Ho Kil Oh, Asan-si (KR); Jae-Hoon Jung, Incheon (KR)

(73) Assignee: Samsung Display Co., Ltd., Yongin (KR)

( * ) Notice: Subject to any disclaimer, the term of this patent is extended or adjusted under 35 U.S.C. 154(b) by 40 days.

(21) Appl. No.: 13/536,388

(22) Filed: Jun. 28, 2012

(65) Prior Publication Data

US 2013/0083263 A1    Apr. 4, 2013

(30) Foreign Application Priority Data

Sep. 29, 2011   (KR) .................. 10-2011-0098704

(51) Int. Cl.
*G02F 1/136*        (2006.01)

(52) U.S. Cl.
USPC ........................................................... 349/48

(58) Field of Classification Search
CPC ................................................. G02F 1/13624
USPC ........................................................... 349/48
See application file for complete search history.

(56) References Cited

U.S. PATENT DOCUMENTS

| | | |
|---|---|---|
| 7,705,946 B2 | 4/2010 | Hirota |
| 2005/0206823 A1 | 9/2005 | Lai et al. |
| 2007/0120797 A1* | 5/2007 | Lin et al. .................. 345/92 |
| 2012/0105785 A1* | 5/2012 | Kim et al. ................. 349/139 |

FOREIGN PATENT DOCUMENTS

| | | |
|---|---|---|
| JP | 3597388 | 9/2004 |
| JP | 4603560 | 10/2010 |
| KR | 10-0587364 | 5/2006 |
| KR | 1020060104525 | 10/2006 |
| KR | 10-0685312 | 2/2007 |
| KR | 1020070070402 | 7/2007 |
| KR | 10-0789086 | 12/2007 |
| KR | 1020080003176 | 1/2008 |
| KR | 1020080051895 | 6/2008 |
| KR | 1020080071042 | 8/2008 |
| KR | 1020120060996 | 6/2012 |

* cited by examiner

*Primary Examiner* — Phu Vu
(74) *Attorney, Agent, or Firm* — H.C. Park & Associates, PLC

(57) ABSTRACT

A liquid crystal display according to exemplary embodiments of the present invention is provided in which an additional storage capacitor is formed to a subpixel electrode connected to the dividing switching element, thereby increasing the total storage capacitance. Due to the additional storage capacitor, the kickback voltage difference between two subpixels that may be generated by the additional dividing switching element is eliminated such that the display quality deterioration has been improved by preventing the kickback voltage difference between the two subpixels.

19 Claims, 23 Drawing Sheets

US 8,810,745 B2

LIQUID CRYSTAL DISPLAY

CROSS-REFERENCE TO RELATED APPLICATION

This application claims priority to and benefit of Korean Patent Application No. 10-2011-0098704, filed on Sep. 29, 2011, which is herein incorporated by reference for all purposes as if fully set forth herein.

BACKGROUND OF THE INVENTION

1. Field of the Invention

Exemplary embodiments of the present invention relate to a liquid crystal display.

2. Description of the Related Art

As one of widely used flat panel displays, typically, a liquid crystal display (LCD) includes two display panels provided with field generating electrodes such as pixel electrodes and a common electrode, and a liquid crystal layer interposed therebetween. The LCD displays images by applying voltages to the field-generating electrodes to generate an electric field in the LC layer that determines the orientation of LC molecules therein to adjust polarization of incident light.

Among the LCDs, a vertical alignment (VA) mode LCD, which aligns LC molecules such that their long axes are perpendicular to the panels in the absence of an electric field, has been adopted because of its high contrast ratio and wide reference viewing angle.

In the vertical alignment (VA) mode LCD, the wide reference viewing angle can be realized by forming a plurality of domains including liquid crystal of different alignment directions in one pixel.

As for means for forming a plurality of domains in one pixel, minute slit or a cutout formed in the field generating electrodes or a protrusion formed on the field generating electrodes have been proposed. By using these methods, a plurality of domains may be formed by aligning the liquid crystal molecules vertically with respect to a fringe field generated between the edges of the cutout or the protrusion and the field generating electrodes facing the edges.

However, the liquid crystal display of the vertical alignment (VA) mode has lower side visibility compared with front visibility. Thus, it has been proposed that one pixel is divided into two subpixels and different voltages are applied to the subpixels to solve the low side visibility problem. As a method of applying the different voltages to two subpixels, a method of dividing the voltage applied to one subpixel through an additional switching element has been proposed to decrease a charged voltage thereof, thereby changing the voltages of the two subpixels. Because of the additional switching element, however, a difference of a kickback voltage between the two subpixels may be generated, and a visibility may be deteriorated by the difference of kickback voltage between the two subpixels.

Therefore, there is need for an approach to improve a visibility of a display panel.

The above information disclosed in this Background section is only to set up Applicant's recognition of problems within existing art and merely for enhancement of understanding of the background of the invention based on the identified source of problems, and therefore the above information cannot be used as prior art in determining obviousness into the present invention.

SUMMARY OF THE INVENTION

These and other needs are addressed by the present invention, in which exemplary embodiments of the present invention provides a liquid crystal display in which a display quality is improved by preventing a difference of a kickback voltage between two subpixel electrodes while increasing visibility of the liquid crystal display.

Additional features of the invention will be set forth in the description which follows, and in part will be apparent from the description, or may be learned by practice of the invention.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

Exemplary embodiments of the present invention disclose a liquid crystal display. The liquid crystal display includes a first substrate and a second substrate facing each other and a liquid crystal layer which is interposed between the first substrate and the second substrate, and the liquid crystal layer comprises liquid crystal molecules. The liquid crystal layer also includes a gate line formed on the first substrate and a storage electrode disposed on the first substrate. The liquid crystal layer includes a data line disposed on the first substrate and includes a first thin film transistor and a second thin film transistor connected to the gate line and the data line. The liquid crystal layer includes a third thin film transistor connected to the gate line and the second thin film transistor; and the liquid crystal layer also includes a pixel electrode which comprises a first pixel electrode connected to the first thin film transistor and a second pixel electrode connected to the second thin film transistor, wherein the drain electrode of the second thin film transistor comprises an expansion, and the expansion overlaps a portion of the storage electrode thereby forming a storage capacitor.

Exemplary embodiments of the present invention disclose a liquid crystal display. The liquid crystal display includes a first substrate and a second substrate facing each other. The liquid crystal display also includes a liquid crystal layer which is interposed between the first substrate and the second substrate, the liquid crystal layer comprising liquid crystal molecules. The liquid crystal display also includes a gate line disposed on the first substrate, a storage electrode disposed on the first substrate, and a data line disposed on the first substrate. The liquid crystal display includes a first thin film transistor and a second thin film transistor connected to the gate line and the data line, and a third thin film transistor connected to the gate line and the second thin film transistor. The liquid crystal display includes a pixel electrode which comprises a first pixel electrode connected to the first thin film transistor and a second pixel electrode connected to the second thin film transistor, wherein the first pixel electrode and the second pixel electrode comprise a cross stem comprising a transverse stem and a longitudinal stem intersecting the transverse stem and a plurality of minute branches extending from the cross stem. The storage electrode comprises a first storage electrode overlapping a portion of the first pixel electrode and a second storage electrode overlapping a portion of the second pixel electrode, and the second storage electrode comprises a third storage electrode overlapping at least one of the transverse stem and the longitudinal stem of the second pixel electrode.

According to an exemplary embodiment of the present invention includes: a first substrate and a second substrate facing each other; a liquid crystal layer interposed between the first and second substrates and including liquid crystal molecules; a gate line formed on the first substrate and transmitting a gate signal; a storage electrode formed on the first substrate; a data line formed on the first substrate and transmitting a data signal; a first thin film transistor and a second thin film transistor connected to the gate line and the data line; a third thin film transistor connected to the gate line and the second thin film transistor; and a pixel electrode including a first pixel electrode connected to the first thin film transistor and a second pixel electrode connected to the second thin film transistor, wherein the drain electrode of the second thin film transistor has an expansion, and the expansion overlaps a portion of the storage electrode thereby forming a first storage capacitor.

The first pixel electrode and the second pixel electrode may include a cross stem made of a transverse stem and a longitudinal stem intersecting the transverse stem, and a plurality of minute branches extending from the cross stem.

The storage electrode may include a first storage electrode overlapping a portion of the first pixel electrode and a second storage electrode overlapping a portion of the second pixel electrode.

The second storage electrode may include a third storage electrode overlapping at least one of the transverse stem and the longitudinal stem of the second pixel electrode.

The width of the third storage electrode may not be uniform.

The width of the third storage electrode may be gradually increased from the center of the second pixel electrode to the edge of the second pixel electrode.

The width of the third storage electrode may be gradually decreased from the center of the second pixel electrode to the edge of the second pixel electrode.

The first pixel electrode and the second pixel electrode may include a plurality of sub-regions where a plurality of minute branches extend from the cross stem in different directions.

The liquid crystal display may further include a shielding electrode overlapping the data line, and the width of the shielding electrode is narrower than the width of the data line.

The shielding electrode may be applied with a voltage of the same magnitude as the voltage of the drain electrode of the third thin film transistor.

A liquid crystal display according to another exemplary embodiment of the present invention includes: a first substrate and a second substrate facing each other; a liquid crystal layer interposed between the first and second substrates and including liquid crystal molecules; a gate line formed on the first substrate and transmitting a gate signal; a storage electrode formed on the first substrate; a data line formed on the first substrate and transmitting a data signal; a first thin film transistor and a second thin film transistor connected to the gate line and the data line; a third thin film transistor connected to the gate line and the second thin film transistor; and a pixel electrode including a first pixel electrode connected to the first thin film transistor and a second pixel electrode connected to the second thin film transistor, wherein the first pixel electrode and the second pixel electrode include a cross stem having a transverse stem and a longitudinal stem intersecting the transverse stem and a plurality of minute branches extending from the cross stem, the storage electrode includes a first storage electrode overlapping a portion of the first pixel electrode and a second storage electrode overlapping a portion of the second pixel electrode, and the second storage electrode includes a third storage electrode overlapping at least one of the transverse stem and the longitudinal stem of the second pixel electrode. In a case of a liquid crystal display according to an exemplary embodiment of the present invention, the additional storage capacitor is formed to the subpixel electrode connected to the dividing switching element, thereby increasing the total storage capacitance. By this, the kickback voltage difference between two subpixels that may be generated by the additional dividing switching element is eliminated such that the display quality deterioration according to the kickback voltage difference between the two subpixels may be prevented.

It is to be understood that both the foregoing general description and the following detailed description are exemplary and explanatory and are intended to provide further explanation of the invention as claimed.

DETAILED DESCRIPTION OF THE ILLUSTRATED EMBODIMENTS

Figure 1:
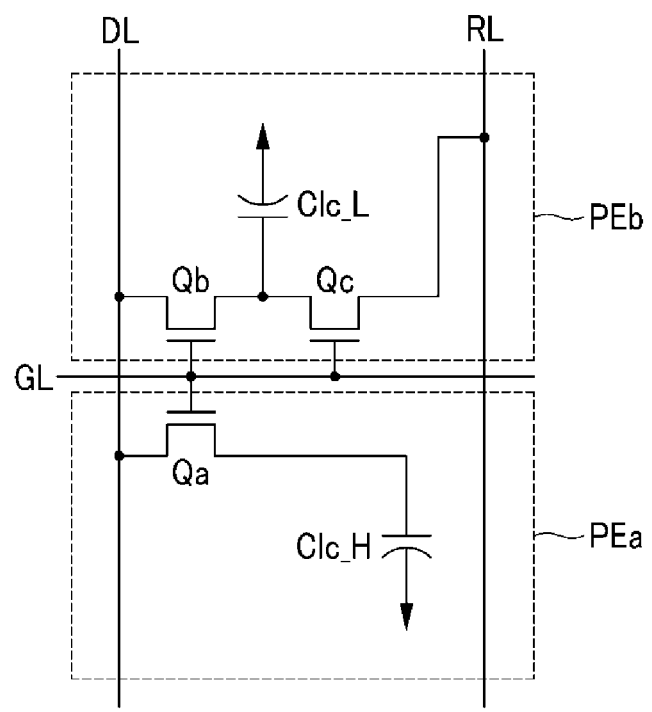
FIG. 1 is a circuit diagram of a pixel of a liquid crystal display according to exemplary embodiments of the present invention.

A liquid crystal display and method of manufacturing a liquid crystal display are disclosed. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

In the drawings, the thickness of layers, films, panels, and regionsare exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Figure 2:
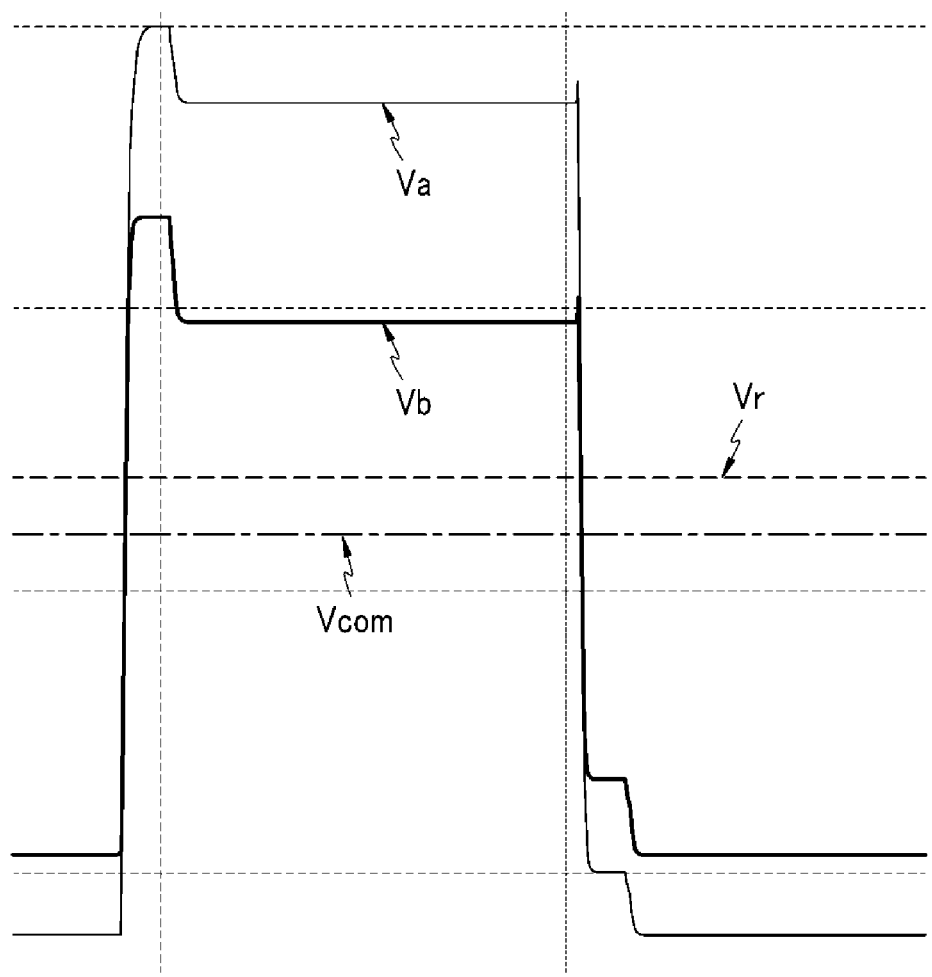
FIG. 2 is a waveform diagram of signals applied to a pixel of a liquid crystal display according to exemplary embodiments of the present invention.

Now, an arrangement and a driving method of a signal line and a pixel of a liquid crystal display according to exemplary embodiments of the present invention will be described with reference to FIG. 1 and FIG. 2. FIG. 1 is a circuit diagram of a pixel of a liquid crystal display according to an exemplary embodiment of the present invention, and FIG. 2 is a waveform diagram of signals applied to a pixel of a liquid crystal display according to exemplary embodiments of the present invention.

Referring to FIG. 1, one pixel PX of a liquid crystal display, according to the exemplary embodiments, includes a plurality of signal lines including a gate line GL transmitting a gate signal and a data line DL transmitting a data signal, and a reference voltage line RL transmitting a dividing reference voltage, as well as a first switching element Qa, a second switching element Qb, and a third switching element Qc and a first liquid crystal capacitor Clc H and a second liquid crystal capacitor Clc L connected to the plurality of signal lines.

The first switching element Qa and the second switching element Qb are respectively connected to the gate line GL and the data line DL, and the third switching element Qc is connected to the output terminal of the second switching element Qb and the reference voltage line RL.

The first switching element Qa and the second switching element Qb as three terminal elements such as a thin film transistor include a control terminal connected to the gate line GL and an input terminal connected to the data line DL, an output terminal of the first switching element Qa connected to the first liquid crystal capacitor Clc H, and an output terminal of the second switching element Qb connected to the input terminal of the second liquid crystal capacitor Clc L and the third switching element Qc.

The third switching element Qc as the three terminal element such as the thin film transistor includes the control terminal connected to the gate line GL, the input terminal connected to the second liquid crystal capacitor Clc L, and the output terminal connected to the reference voltage line RL.

Referring to FIG. 2, if the gate line GL is applied with a gate-on signal Von, the first switching element Qa, the second switching element Qb, and the third switching element Qc connected thereto are turned on. Accordingly, the data voltage applied to the data line DL is applied to a first subpixel electrode PEa and a second subpixel electrode PEb through the turned-on first switching element Qa and second switching element Qb. At this time, the data voltages applied to the first subpixel electrode PEa and the second subpixel electrode PEb are the same, and the first liquid crystal capacitor Clc H and the second liquid crystal capacitor Clc L are charged with the same voltage by a difference between the common voltage Vcom and the data voltage. Simultaneously, the voltage charged to the second liquid crystal capacitor Clc L is divided through the turned-on third switching element Qc. Accordingly, the voltage charged to the second liquid crystal capacitor Clc L is decreased by the difference of the common voltage Vcom and the reference voltage Vr. That is, the voltage Va charged to the first liquid crystal capacitor Clc H is higher than the voltage Vb charged to the second liquid crystal capacitor Clc L.

In this way, the voltage charged to the first liquid crystal capacitor Clc H and the voltage charged to the second liquid crystal capacitor Clc L are different from each other. The voltage charged to the first liquid crystal capacitor Clc H and the voltage charged to the second liquid crystal capacitor Clc L are different from each other such that the inclined angles of the liquid crystal molecules are different in the first subpixel and the second subpixel, thereby changing the luminance of the two subpixels. Therefore, when the charging voltages of the first liquid crystal capacitor Clc H and the second liquid crystal capacitor Clc L are appropriately adjusted, it is contemplated to make an image viewed from the side be as similar as possible to an image viewed from the front, consequently, improving the side visibility. At this time, the level of the reference voltage Vr may be higher than the level of the common voltage Vcom, and it is contemplated that the difference of the absolute values therebetween is in the range of about 1V to about 4V. For example, when the common voltage Vcom is about 7V, reference voltage Vr may be in the range of about 8V to about 11V.

Figure 3:
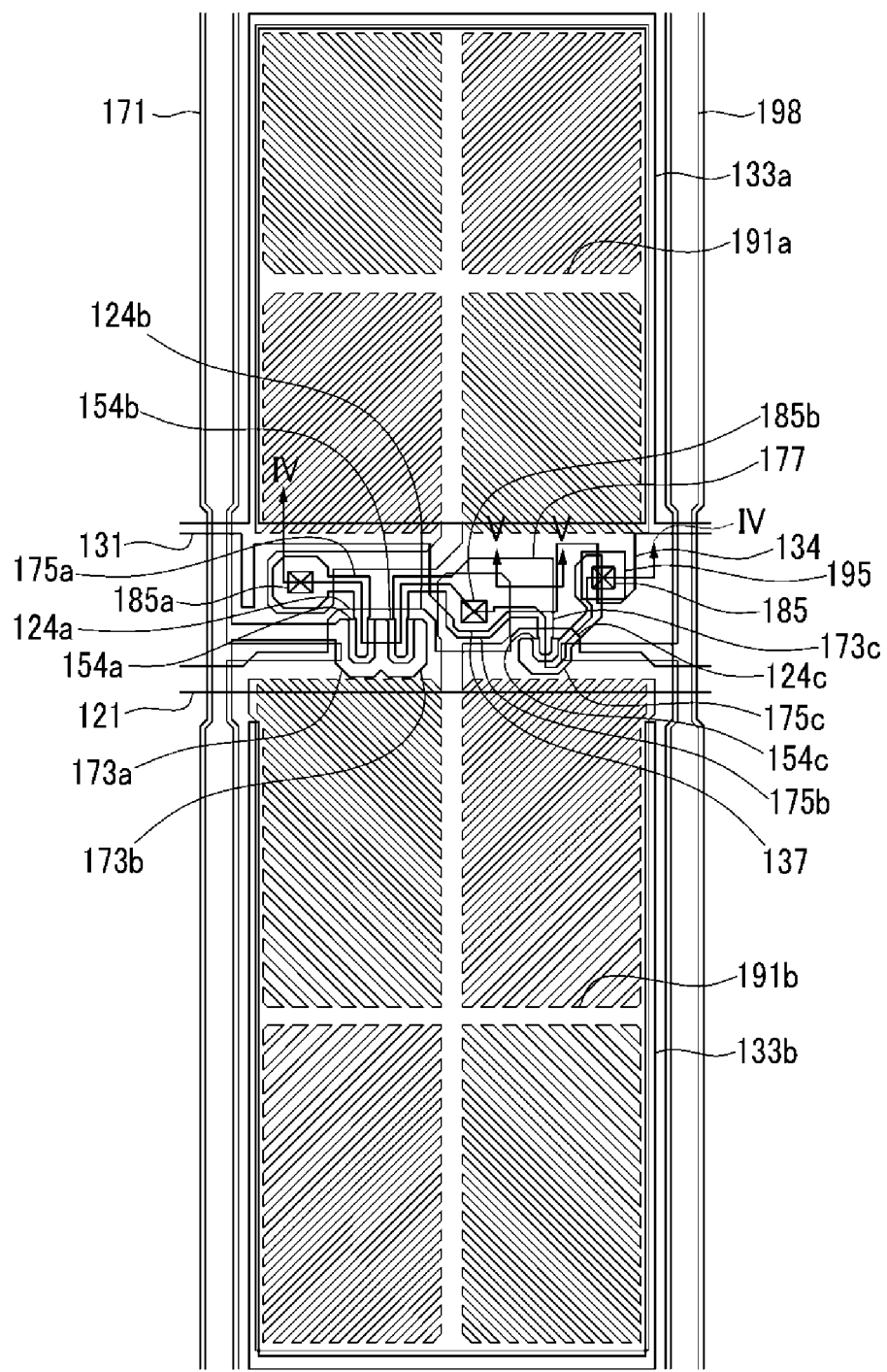
FIG. 3 is a layout view of an exemplary pixel of a liquid crystal display according to exemplary embodiments of the present invention.

A structure of a liquid crystal display according to the exemplary embodiment shown in FIG. 1 will now be described with reference to FIG. 3 to FIG. 5. FIG. 3 is a layout view of an exemplary pixel of a liquid crystal display according to exemplary embodiments of the present invention, FIG. 4 is a cross-sectional view of the liquid crystal display taken along the line IV-IV of FIG. 3, and FIG. 5 is a cross-sectional view of the liquid crystal display taken along the line V-V of FIG. 3.

Figure 4:
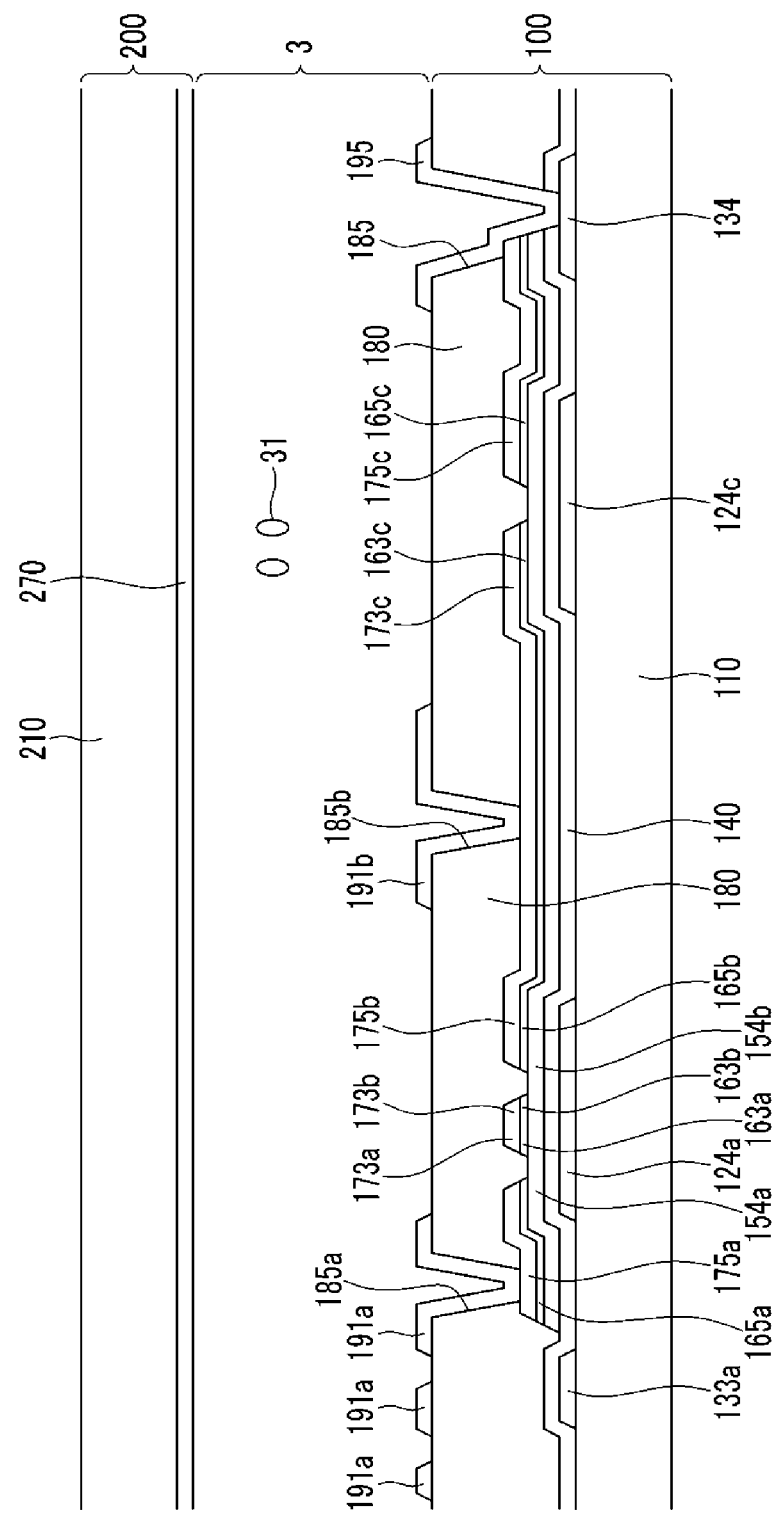
FIG. 4 is a cross-sectional view of the liquid crystal display taken along the line IV-IV of FIG. 3.
Figure 5:
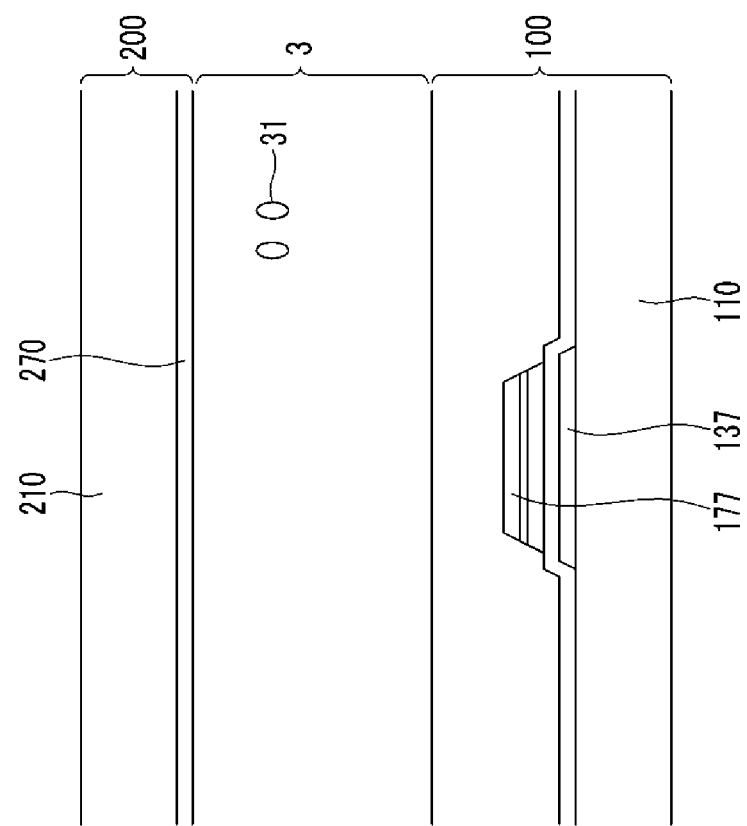
FIG. 5 is a cross-sectional view of the liquid crystal display taken along the line V-V of FIG. 3.

Referring to FIG. 3 to FIG. 5, a liquid crystal display, according to the exemplary embodiments, includes a lower panel 100 and an upper panel 200 facing each other, a liquid crystal layer 3 interposed between the two display panels 100 and 200, and a pair of polarizers (not shown) attached at the outer surfaces of the display panels 100 and 200.

Now, the lower panel 100 will be described.

A gate conductor including a gate line 121 and a reference voltage line 131 is formed on an insulation substrate 110 made of transparent glass or plastic.

The gate line 121 includes a first gate electrode 124a, a second gate electrode 124b, a third gate electrode 124c, and an end portion (not shown) having a wide area for connection to other layers or an external driving circuit.

The reference voltage line 131 includes a first storage electrode 133a, a second storage electrode 133b, and a reference electrode 134. The first storage electrode 133a includes a storage expansion 137.

A gate insulating layer 140 is formed on the gate line 121 and the reference voltage line 131.

A first semiconductor 154a, a second semiconductor 154b, and a third semiconductor 154c are formed on the gate insulating layer 140.

A plurality of ohmic contacts 163a, 165a, 163b, 165b, 163c, and 165c are formed on the semiconductors 154a, 154b, and 154c.

A data conductor, including a plurality of data lines 171 including a first source electrode 173a and a second source electrode 173b, a first drain electrode 175a, a second drain electrode 175b, a third source electrode 173c, and a third drain electrode 175c, is formed on the ohmic contacts 163a, 165a, 163b, 165b, 163c, and 165c and the gate insulating layer 140.

The data conductor, and the semiconductor and the ohmic contact disposed thereunder, may be simultaneously formed by using a mask.

The data line 171 has an end portion (not shown) having a wide area for connection to other layers or an external driving circuit.

The first gate electrode 124a, the first source electrode 173a, and the first drain electrode 175a form a first thin film transistor (TFT) Qa along with the first semiconductor island 154a, and a channel of the thin film transistor is formed in the semiconductor 154a between the first source electrode 173a and the first drain electrode 175a. Similarly, the second gate electrode 124b, the second source electrode 173b, and the second drain electrode 175b form a second thin film transistor Qb along with the second semiconductor island 154b, and the channel is formed in the semiconductor island 154b between the second source electrode 173b and the second drain electrode 175b, and the third gate electrode 124c, the third source electrode 173c, and the third drain electrode 175c form a third thin film transistor Qc along with the third semiconductor island 154c, and the channel is formed in the semiconductor 154c between the third source electrode 173c and the third drain electrode 175c.

The second drain electrode 175b is connected to the third source electrode 173c and includes the expansion 177 having a wide area.

A passivation layer 180 is formed on the data conductor (171, 173c, 175a, 175b, and 175c) and the exposed semiconductors 154a, 154b, and 154c. The passivation layer 180 is made of an inorganic insulator such as silicon nitride and silicon oxide. However, the passivation layer 180 may be made of an organic insulator, and a surface thereof may be flat. The organic insulator can have photosensitivity, it may have a dielectric constant is not greater than about 4.0. Also, the passivation layer 180 may have a dual-layered structure of a lower inorganic layer and an upper organic layer so that it may not harm the exposed portion of the exposed semiconductors 154a, 154b, and 154c while still sustaining the excellent insulation characteristics of the organic layer.

The passivation layer 180 and the gate insulating layer 140 have a first contact hole 185 exposing a portion of the reference electrode 134 and the third drain electrode 175c, and a first contact hole 185 covers a connecting member 195. The connecting member 195 electrically connects the reference electrode 134 and the third drain electrode 175c exposed through the first contact hole 185 to each other.

The passivation layer 180 has a second contact hole 185a and a third contact hole 185b exposing the first drain electrode 175a and the second drain electrode 175b.

A pixel electrode including a first subpixel electrode 191a and a second subpixel electrode 191b is formed on the passivation layer 180. The pixel electrode may be made of a transparent material such as indium tin oxide (ITO) or indium zinc oxide (IZO). The pixel electrode 191 may be made of a transparent conductive material such as ITO or IZO, or a reflective metal such as aluminum, silver, chromium, or alloys thereof.

A shielding electrode 198 is formed on the passivation layer 180. The shielding electrode 198 may be formed with the same layer as the pixel electrode or with a different layer therefrom. The shielding electrode 198 may be applied with a voltage having the same magnitude as the voltage flowing in the reference voltage line 131.

The shielding electrode 198 may prevent coupling between the voltage flowing in the data line 171 and the common voltage flowing in a common electrode 270 of the upper panel 200.

The first subpixel electrode 191a and the second subpixel electrode 191b neighbor each other in the column direction and the overall shape thereof is quadrangular, and includes a cross stem having a transverse stem and a longitudinal stem intersecting thereto. The first and second sub-pixel electrodes 191a and 191b are divided into four sub-regions by the transverse stem and the longitudinal stem, and each of the sub-regions includes a plurality of minute branches.

One of the minute branches of the first subpixel electrode 191a and the second subpixel electrode 191b obliquely extends from the transverse stem or the longitudinal stem in the left upper direction, and the other minute branch obliquely extends from the transverse stem or the longitudinal stem in the right upper direction. Also, another minute branch obliquely extends from the transverse stem or the longitudinal stem in the left lower direction, and the other minute branch obliquely extends from the transverse stem or the longitudinal stem in the left right direction.

Each minute branches form an angle of approximately 45 degrees or 135 degrees with the gate lines 121 or the transverse stem.

Further, two neighboring minute branches may be orthogonal to each other.

Although not shown, the width of the minute branches may be gradually increased closer to the transverse stem or the longitudinal stem.

The first storage electrode 133a and the second storage electrode 133b of the reference voltage line 131 include two longitudinal portions parallel to the data line 171 and a transverse portion connecting the two longitudinal portions.

The first subpixel electrode 191a and the second subpixel electrode 191b are electrically connected to the first drain electrode 175a and the second drain electrode 175b through the contact holes 185a and 185b, thereby receiving the data voltage from the first drain electrode 175a and the second drain electrode 175b. A portion of the data voltage applied to the second drain electrode 175b is divided through the third source electrode 173c such that the magnitude of the voltage applied to the first subpixel electrode 191a is larger than the magnitude of the voltage applied to the second subpixel electrode 191b.

Also, the level of the voltage applied to the reference voltage line must be higher than the level of the common voltage applied to the common electrode, and the difference of the absolute values is contemplated in a range of about 1V to about 4V. For example, when the common voltage Vcom is about 7V, the reference voltage may be in a range of about 8V to about 11V.

Although not shown, a color filter and a light blocking member may be formed in the lower panel 100. The light blocking member may be formed on a pixel center portion where the first to third switching elements are disposed and the data line. The color filter may almost completely exist in a region enclosed by the light blocking member, and may be formed according to the pixel electrode 191.

Next, the upper panel 200 will be described.

A common electrode 270 is formed on an insulation substrate 210 made of transparent glass or plastic.

Alignment layers (not shown) are formed on both surfaces of the display panels 100 and 200, and may be vertical alignment layers.

Polarizers (not shown) are formed on the outer surface of the display panels 100 and 200, the polarization axis of the two polarizers are crossed, and one polarization axis thereof may be parallel to the gate lines 121. In the case of a reflective liquid crystal display, one of the two polarizers may be omitted to avoid unnecessarily obscuring the present invention.

The liquid crystal layer 3 is interposed between the two panels 100 and 200, and the liquid crystal layer 3 includes liquid crystal molecules 31 having negative dielectric anisotropy. The liquid crystal molecules 31 of the liquid crystal layer 3 have a pretilt so that a long axis thereof is approximately parallel to length directions of the minute branches of the first and second subpixel electrodes 191a and 191b, and may be aligned so as to be perpendicular to the surfaces of the two panels 100 and 200 in a state where an electric field is not applied. The liquid crystal layer 3 further includes an optical polymer, and this optical polymer enables the liquid crystal molecules 31 to have a pretilt angle so that their long axes are substantially parallel to the lengthwise direction of the fine branch portions of the first sub-pixel electrode 191a and the second sub-pixel electrode 191b.

The first subpixel electrode 191a and the second subpixel electrode 191b applied with the data voltage generate the electric field along with the common electrode 270 of the common electrode panel 200 applied with the common voltage such that the tilt of the liquid crystal molecule of the liquid crystal layer 3 among the electrodes 191a, 191b, and 270 is determined. The polarization of the light passing through the liquid crystal layer 3 is changed according to the tilt of the liquid crystal molecule. The first subpixel electrode 191a and the second subpixel electrode 191b and the common electrode 270 form liquid crystal capacitors Clc H and Clc L to maintain the applied voltage after the thin film transistor is turned off. The edge of the minute branches distorts the electric field thereby making the horizontal component perpendicular to the edge of the minute branches, and the inclination direction of the liquid crystal molecules may be determined as the direction that is determined by the horizontal component. Accordingly, the liquid crystal molecules 31 firstly tend to incline in the direction perpendicular to the edge of the minute branches. However, the directions of the horizontal component of the electric field distorted by the sides of the adjacent fine branch portions are opposite to each other and the gap between the fine branch portions is narrow, so that the liquid crystal molecules 31 tending to be tilted in opposite directions to each other are tilted together in a direction parallel to the lengthwise direction of the fine branch portions.

In exemplary embodiments of the present invention, since the long axes of the fine branch portions of one pixel are distributed in four directions, the tilt directions of the liquid crystal molecules 31 are classified into four directions. When the tilt directions of the liquid crystal molecules 31 are diversified in various directions, the reference viewing angle of the liquid crystal display may be increased.

A voltage of the same magnitude as the voltage flowing in the reference voltage line 131 may flow to the shielding electrode 198 of the liquid crystal display according to exemplary embodiments of the present invention such that a difference from the common voltage flowing to the common electrode 270 of the upper panel 200 may be generated. Accordingly, by the difference between the reference voltage flowing to the shielding electrode 198 and the common voltage, the liquid crystal molecules of the liquid crystal layer 3 may be irregularly moved. However, the width of the shielding electrode 198 of the liquid crystal display according to exemplary embodiments of the present invention is smaller than the width of the data line 171 such that the coupling between the shielding electrode 198 and the common electrode 270 becomes small and a portion where the irregular tilt of the liquid crystal molecules may be generated is covered by the data line 171, thus the light is not transmitted, and thereby the display quality deterioration may be prevented by preventing the light transmission through the irregular tilt of the liquid crystal molecules.

Also, the second drain electrode 175 applying the data voltage to the second pixel electrode 191b of the liquid crystal display according to exemplary embodiments of the present invention has the expansion 177, and the expansion 177 overlaps the storage expansion 137 of the reference voltage line 131, thereby forming an additional storage capacitor. Accordingly, the total storage capacitance of the second subpixel may be increased. Accordingly, the increasing of the kickback voltage of the second pixel electrode 191b generated by the third switching element Qc electrically connected to the second pixel electrode 191b is prevented, thereby the display quality deterioration according to the kickback voltage difference between the first pixel electrode 191a and the second pixel electrode 191b may be prevented.

Next, a liquid crystal display according to exemplary embodiments of the present invention will be described with reference to FIG. 6 and FIG. 7. The liquid crystal display with reference to the FIG. 6 and the FIG. 7 is similar to the liquid crystal display according to the exemplary embodiment shown in FIG. 3 to FIG. 5. Therefore, the description of similar constitutions is omitted to avoid unnecessarily obscuring the present invention.

Figure 6:
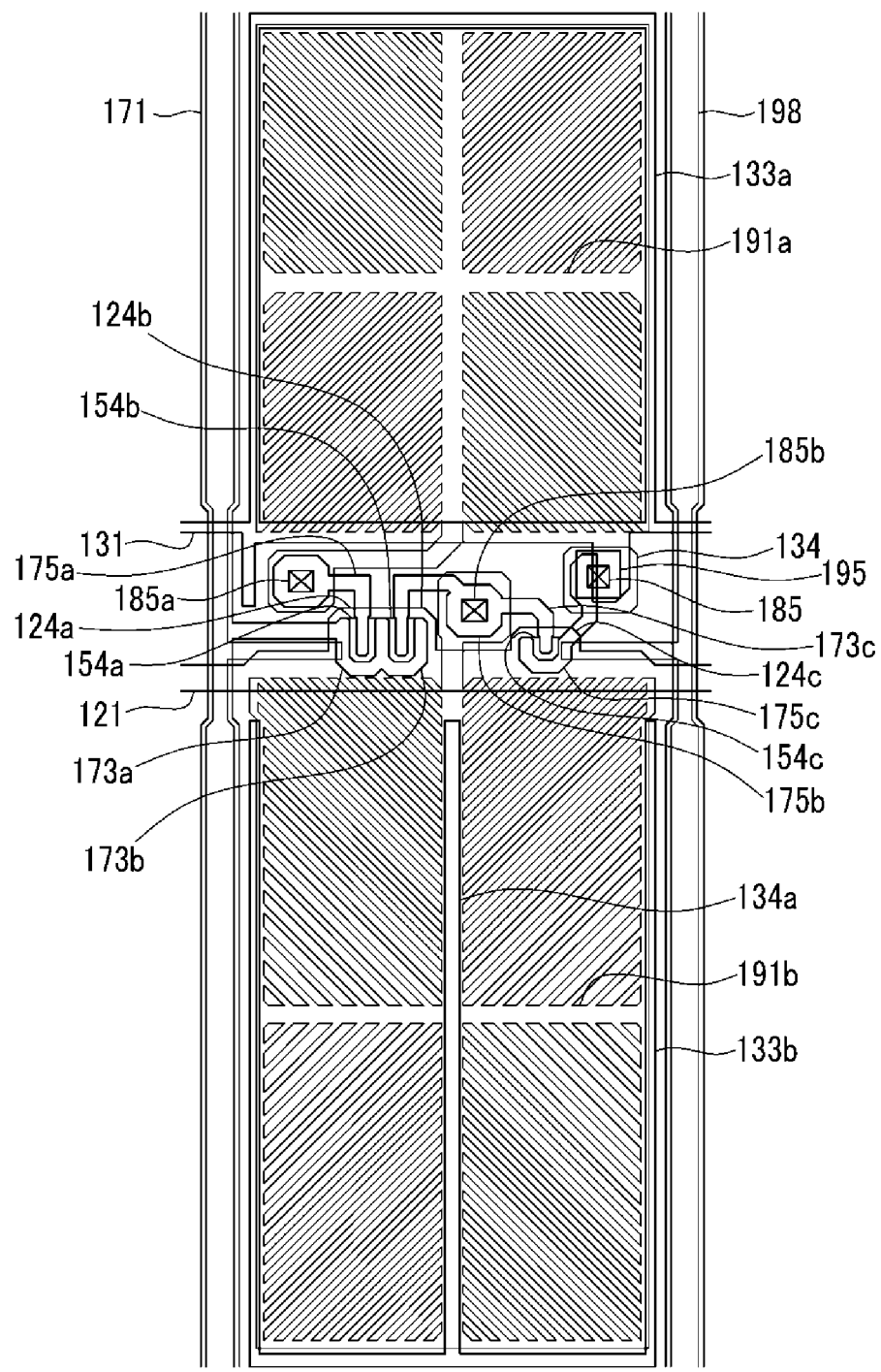
FIG. 6 is a layout view of an exemplary pixel of a liquid crystal display according to exemplary embodiments of the present invention.
Figure 7:
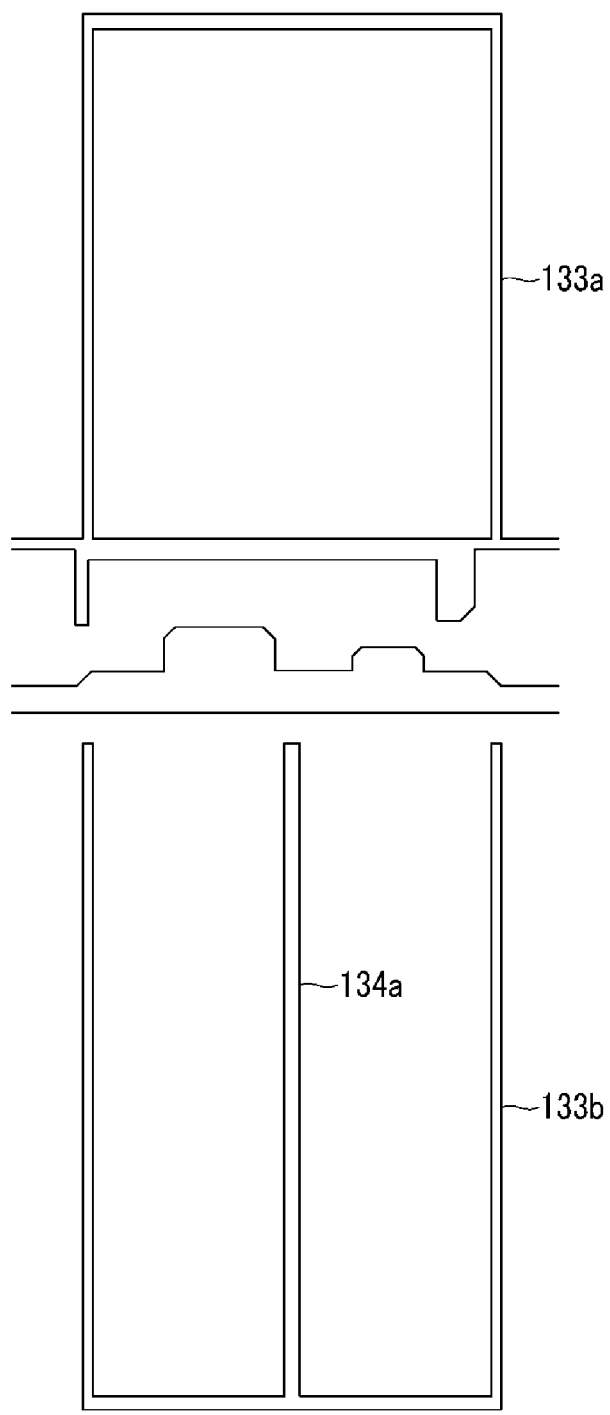
FIG. 7 is a layout view of a gate conductor layer of a liquid crystal display of FIG. 6.

The liquid crystal display with reference to the FIG. 6 and the FIG. 7 further includes a third storage electrode 134a connected to the second storage electrode 133b, differently from the liquid crystal display according to the exemplary embodiment shown in FIG. 3 to FIG. 5.

The third storage electrode 134a overlaps the longitudinal portion among the cross stem of the second pixel electrode 191b, thereby forming an additional storage capacitor. Accordingly, the total storage capacitance of the second subpixel may be increased. Accordingly, the increasing of the kickback voltage of the second pixel electrode 191b generated by the third switching element Qc electrically connected to the second pixel electrode 191b is prevented, and thereby the display quality deterioration according to the kickback voltage difference between the first pixel electrode 191a and the second pixel electrode 191b may be prevented.

Many characteristics of the liquid crystal display according to the exemplary embodiments shown in FIG. 3 to FIG. 5 may be applied to the liquid crystal display according to the exemplary embodiments of the present invention.

Next, a liquid crystal display according to exemplary embodiments of the present invention will be described with reference to FIG. 8 and FIG. 9. The liquid crystal display according to the exemplary embodiments of the present invention is similar to the liquid crystal display according to the exemplary embodiment shown in FIG. 3 to FIG. 5. The description of similar constitutions is omitted to avoid unnecessarily obscuring the present invention.

Figure 8:
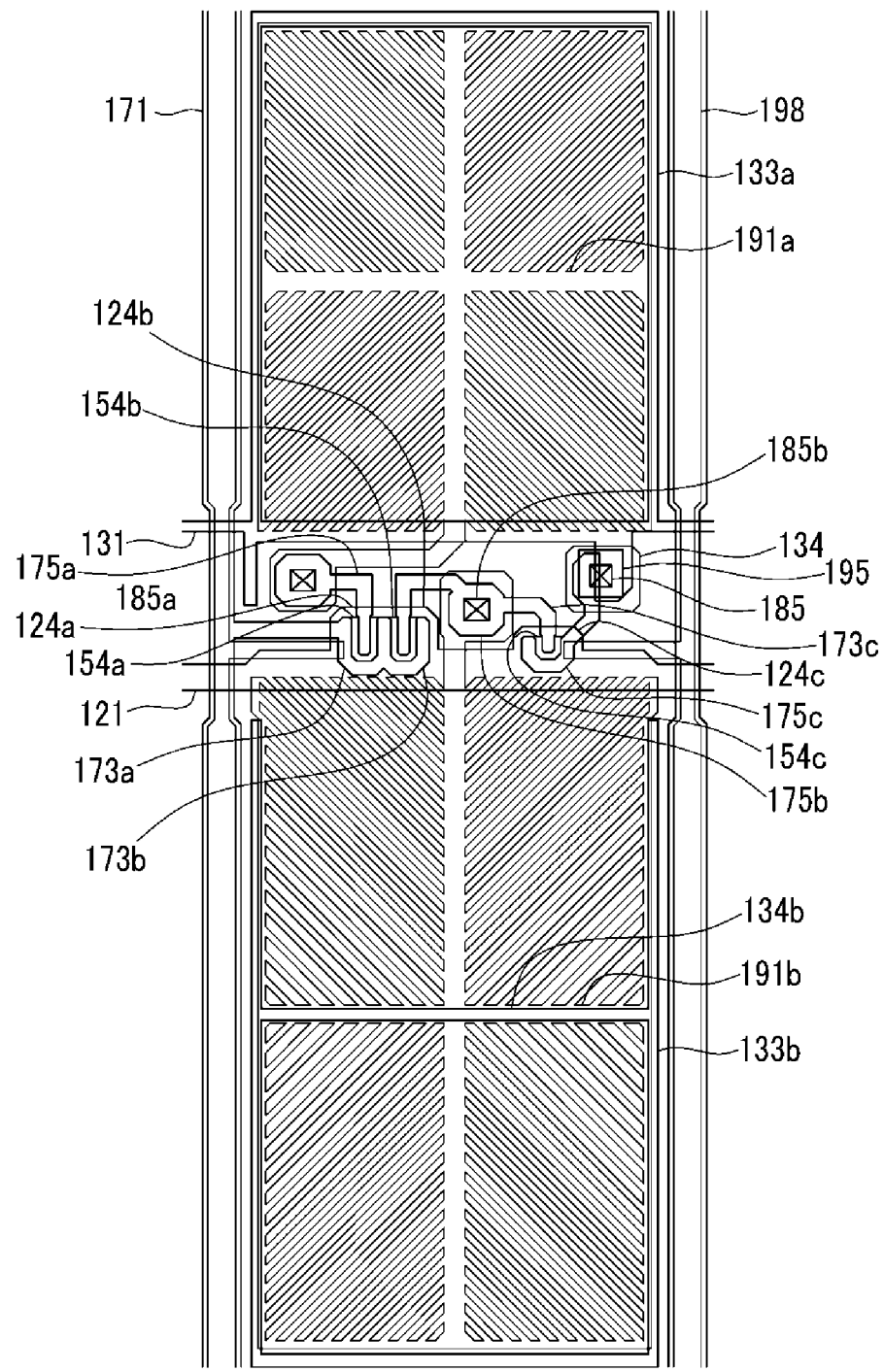
FIG. 8 is a layout view of an exemplary pixel of a liquid crystal display according to exemplary embodiments of the present invention.
Figure 9:
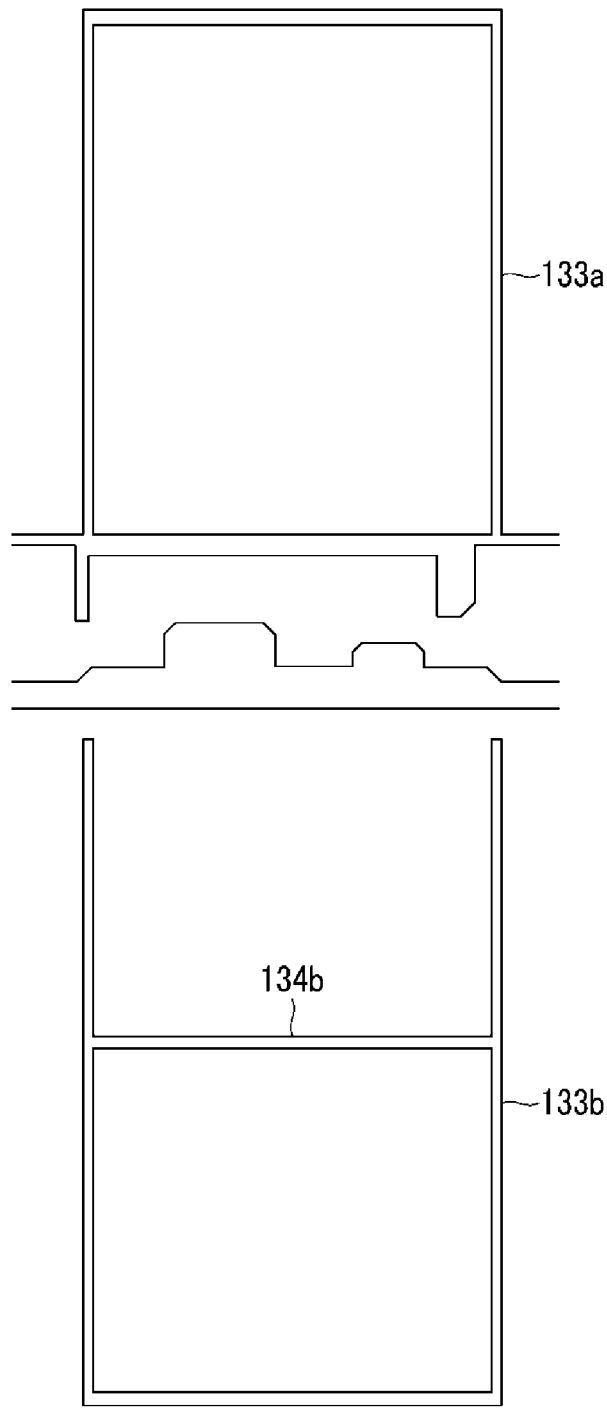
FIG. 9 is a layout view of a gate conductor layer of a liquid crystal display of FIG. 8.

The liquid crystal display with reference to the FIG. 8 and the FIG. 9 further includes a fourth storage electrode 134b connected to the second storage electrode 133b, differently from the liquid crystal display according to the exemplary embodiments shown in FIG. 3 to FIG. 5.

The fourth storage electrode 134b overlaps the transverse portion among the cross stem of the second pixel electrode 191b, thereby forming an additional storage capacitor. Accordingly, the total storage capacitance of the second subpixel may be increased. Accordingly, the increasing of the kickback voltage of the second pixel electrode 191b generated by the third switching element Qc electrically connected to the second pixel electrode 191b is prevented, and thereby the display quality deterioration according to the kickback voltage difference between the first pixel electrode 191a and the second pixel electrode 191b may be prevented.

Many characteristics of the liquid crystal display according to the exemplary embodiment shown in FIG. 3 to FIG. 5 may be applied to the liquid crystal display according to the exemplary embodiments of the present invention.

Next, a liquid crystal display according to exemplary embodiments of the present invention will be described with reference to FIG. 10 and FIG. 11. The liquid crystal display according to the exemplary embodiments is similar to the liquid crystal display according to the exemplary embodiments shown in FIG. 3 to FIG. 5. The description of similar constitutions is omitted to avoid unnecessarily obscuring the present invention.

Figure 10:
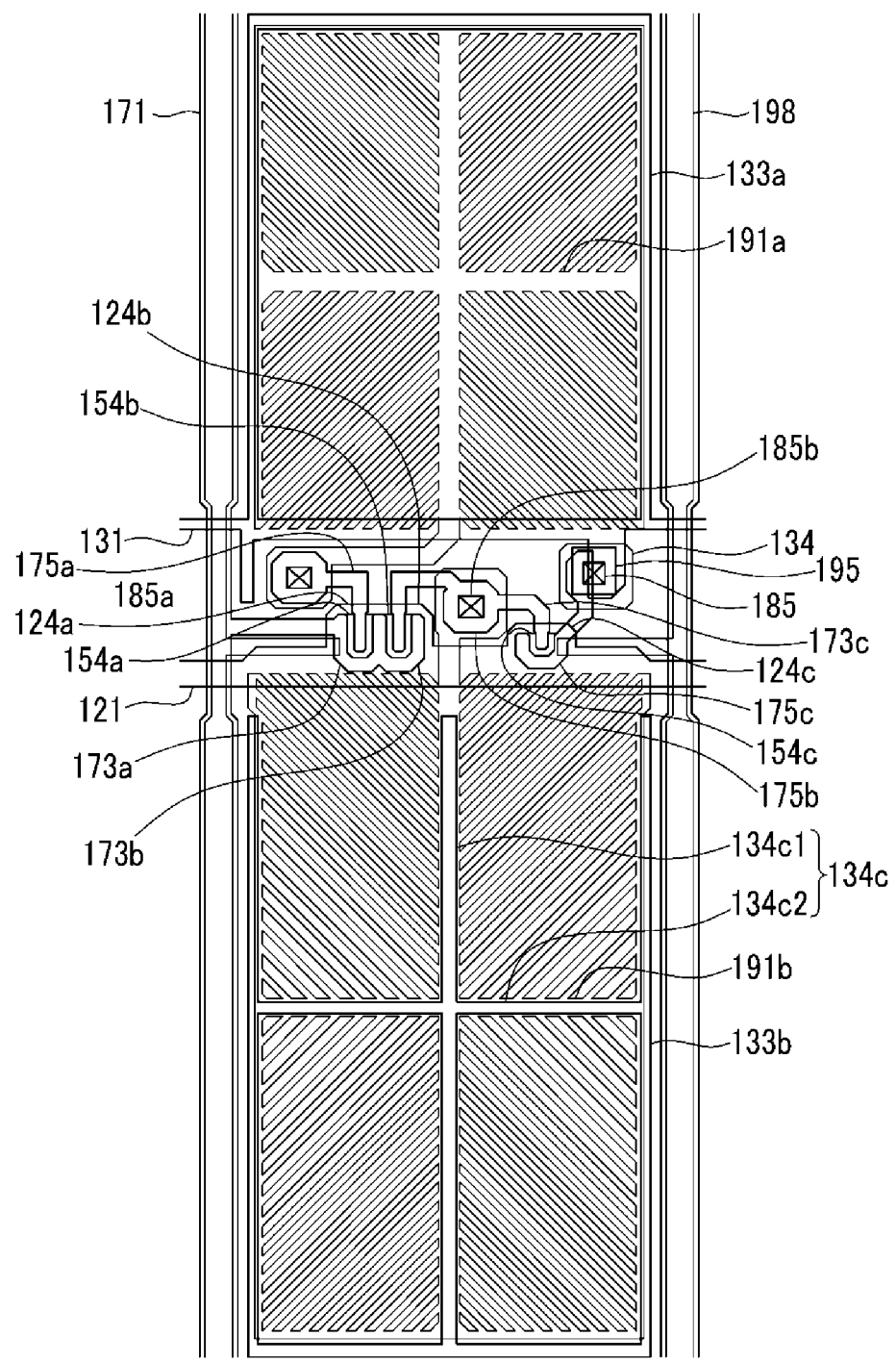
FIG. 10 is a layout view of an exemplary pixel of a liquid crystal display according to exemplary embodiments of the present invention.
Figure 11:
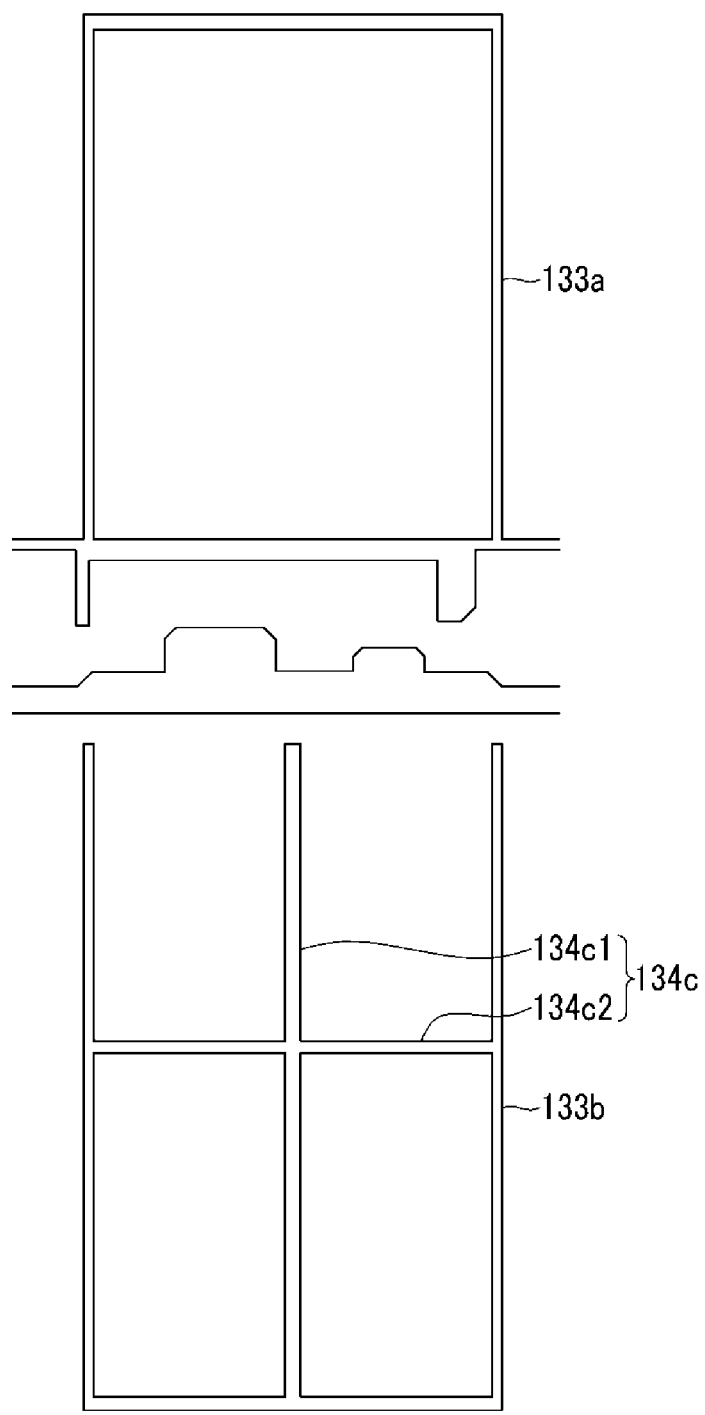
FIG. 11 is a layout view of a gate conductor layer of a liquid crystal display of FIG. 10.

The liquid crystal display with reference to the FIG. 10 and the FIG. 11 further includes a fifth storage electrode 134c connected to the second storage electrode 133b, differently from the liquid crystal display according to the exemplary embodiments shown in FIG. 3 to FIG. 5.

The fifth storage electrode 134c overlaps the cross stem of the second pixel electrode 191b, and includes a first portion 34c1 overlapping the transverse portion of the cross stem of the second pixel electrode 191b and a second portion 134c2 overlapping the longitudinal portion of the cross stem of the second pixel electrode 191b. The fifth storage electrode 134c overlaps the cross stem of the second pixel electrode 191b, thereby forming an additional storage capacitor. Accordingly, the total storage capacitance of the second subpixel may be increased. Consequently, the increasing of the kickback voltage of the second pixel electrode 191b generated by the third switching element Qc electrically connected to the second pixel electrode 191b is prevented, and thereby the display quality deterioration according to the kickback voltage difference between the first pixel electrode 191a and the second pixel electrode 191b may be prevented.

Many characteristics of the liquid crystal display according to the exemplary embodiments shown in FIG. 3 to FIG. 5 may be applied to the liquid crystal display according to the exemplary embodiments of the present invention.

Next, a liquid crystal display according to the exemplary embodiments of the present invention will be described with reference to FIG. 12 and FIG. 13. The liquid crystal display according to the exemplary embodiment of the present invention is similar to the liquid crystal display according to the exemplary embodiments shown in FIG. 3 to FIG. 5. The description of similar constitutions is omitted to avoid unnecessarily obscuring the present invention.

Figure 12:
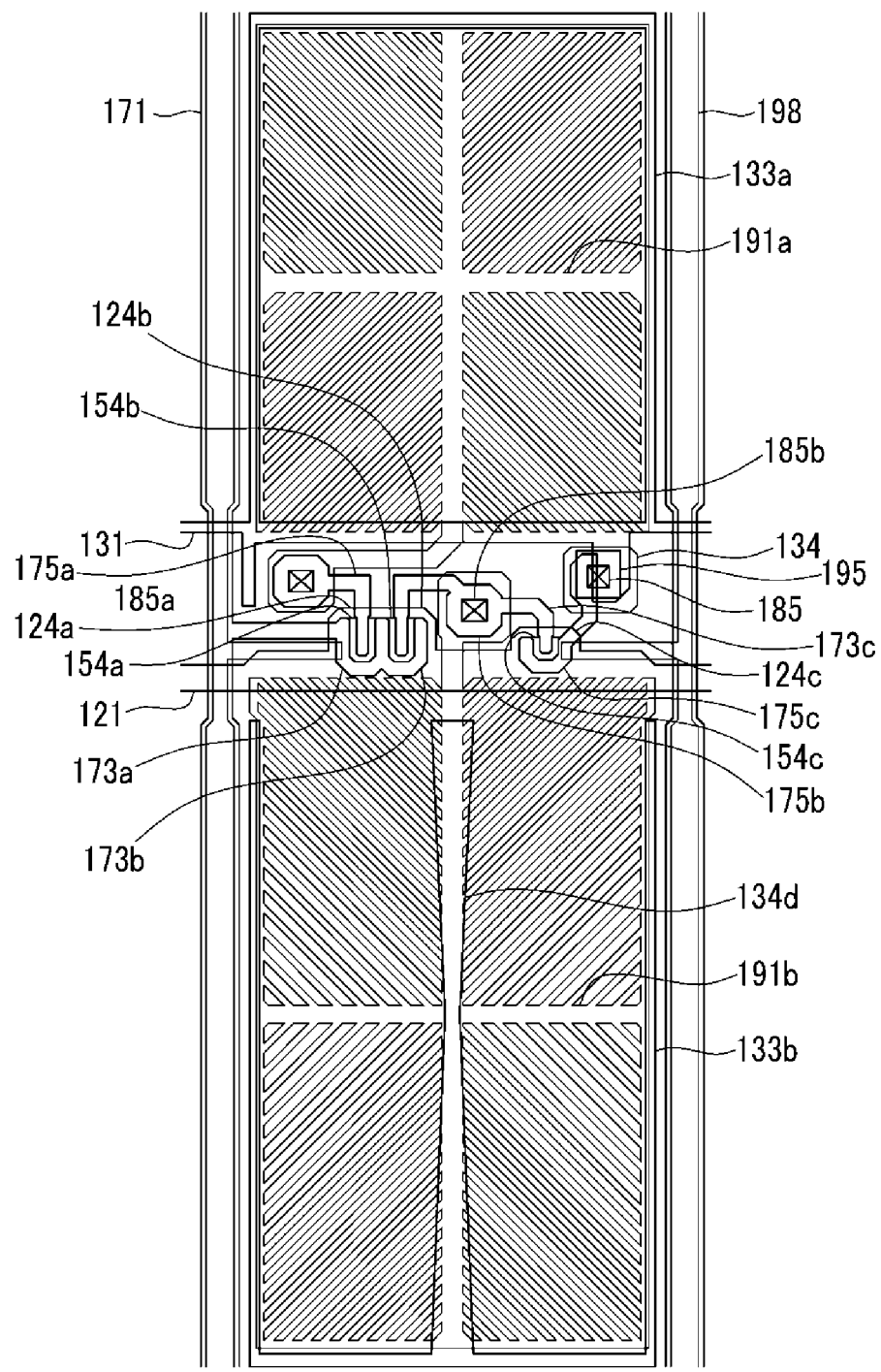
FIG. 12 is a layout view of an exemplary pixel of a liquid crystal display according to exemplary embodiments of the present invention.
Figure 13:
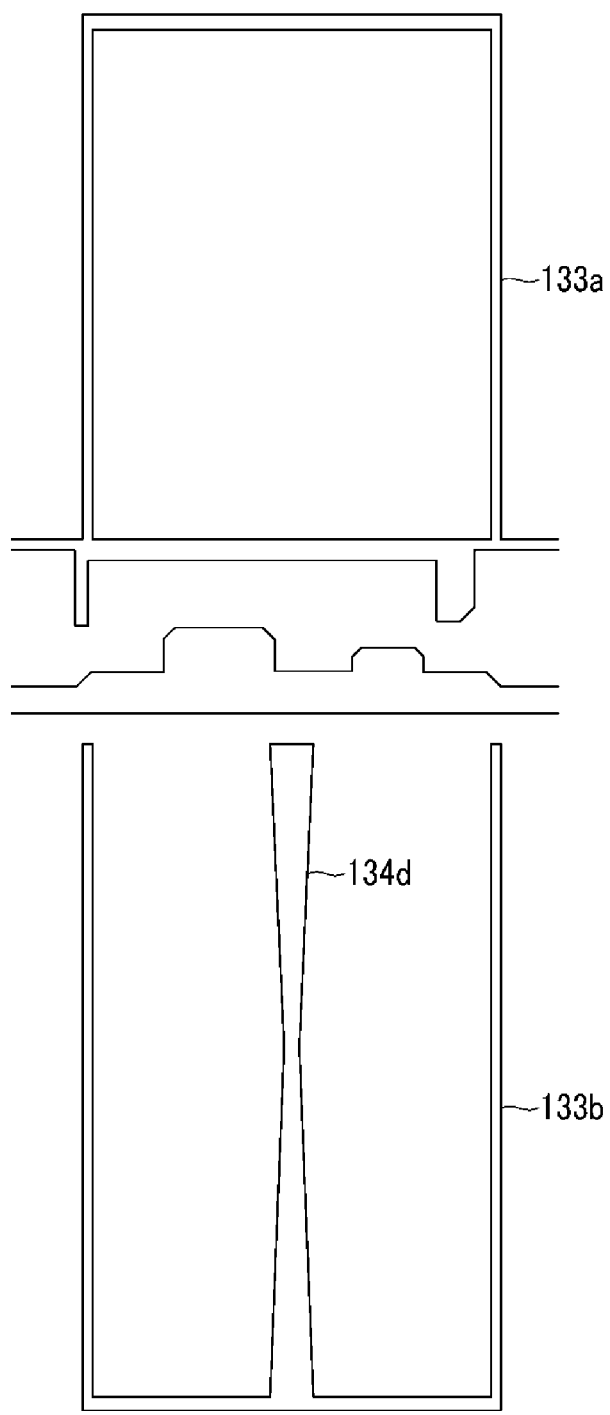
FIG. 13 is a layout view of a gate conductor layer of a liquid crystal display of FIG. 12.

The liquid crystal display with reference to the FIG. 12 and the FIG. 13 further includes a sixth storage electrode 134d connected to the second storage electrode 133b, differently from the liquid crystal display according to the exemplary embodiments shown in FIG. 3 to FIG. 5.

The width of the sixth storage electrode 134d becomes gradually wider from the center portion of the second pixel electrode 191b to the edge. The sixth storage electrode 134d overlaps the the longitudinal portion of the cross stem of the second pixel electrode 191b, thereby forming an additional storage capacitor. Accordingly, the total storage capacitance of the second subpixel may be increased. Consequently, the increasing of the kickback voltage of the second pixel electrode 191b generated by the third switching element Qc electrically connected to the second pixel electrode 191b is prevented, and thereby the display quality deterioration according to the kickback voltage difference between the first pixel electrode 191a and the second pixel electrode 191b may be prevented.

Many characteristics of the liquid crystal display according to the exemplary embodiments shown in FIG. 3 to FIG. 5 may be applied to the liquid crystal display according to the exemplary embodiments of the present invention.

Next, a liquid crystal display according to exemplary embodiments of the present invention will be described with reference to FIG. 14 and FIG. 15. The liquid crystal display according to the exemplary embodiments of the present invention is similar to the liquid crystal display according to the exemplary embodiments shown in FIG. 3 to FIG. 5. Therefore, the description of similar constitutions is omitted to avoid unnecessarily obscuring the present invention.

Figure 14:
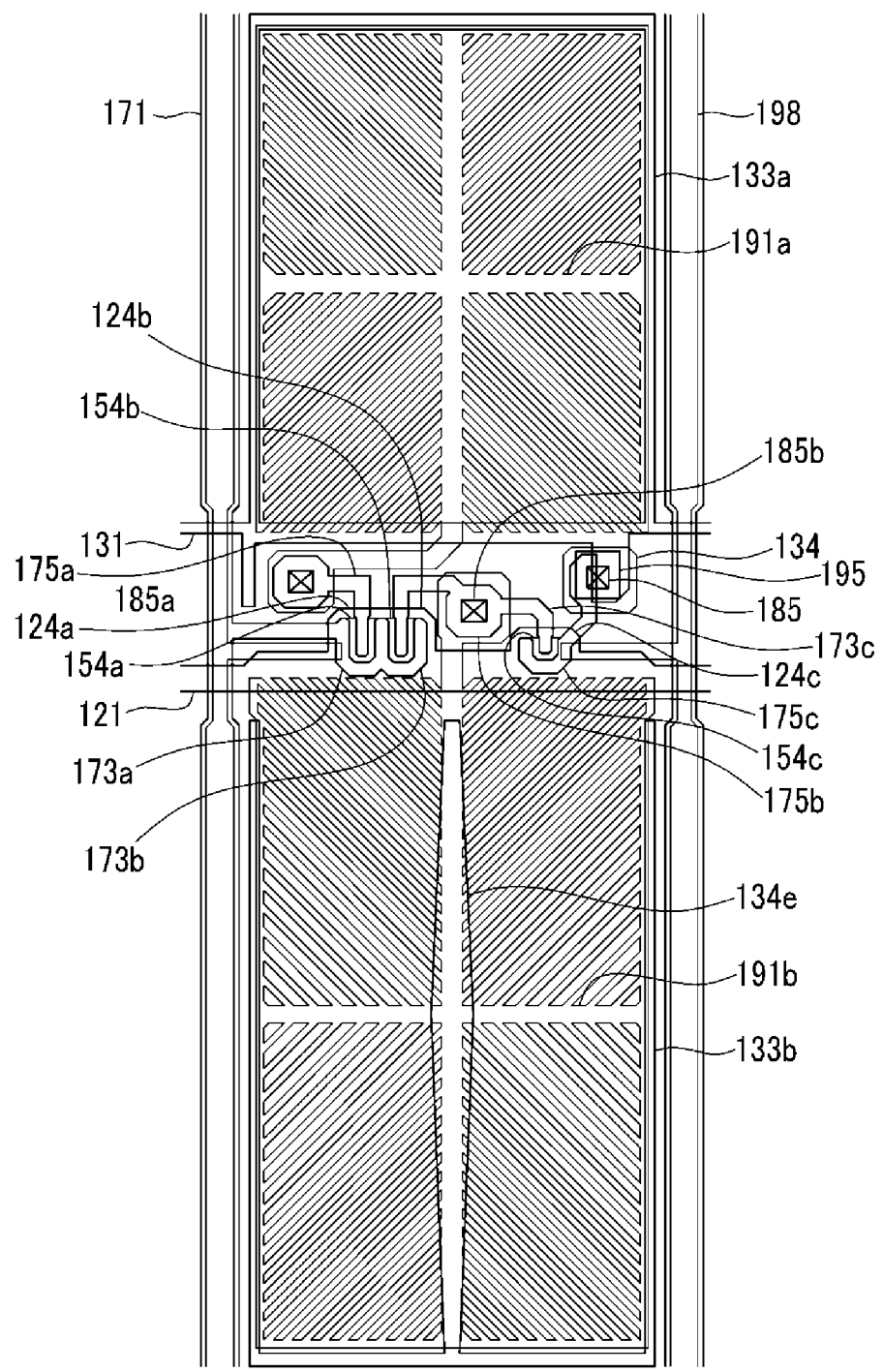
FIG. 14 is a layout view of an exemplary pixel of a liquid crystal display according to exemplary embodiments of the present invention.
Figure 15:
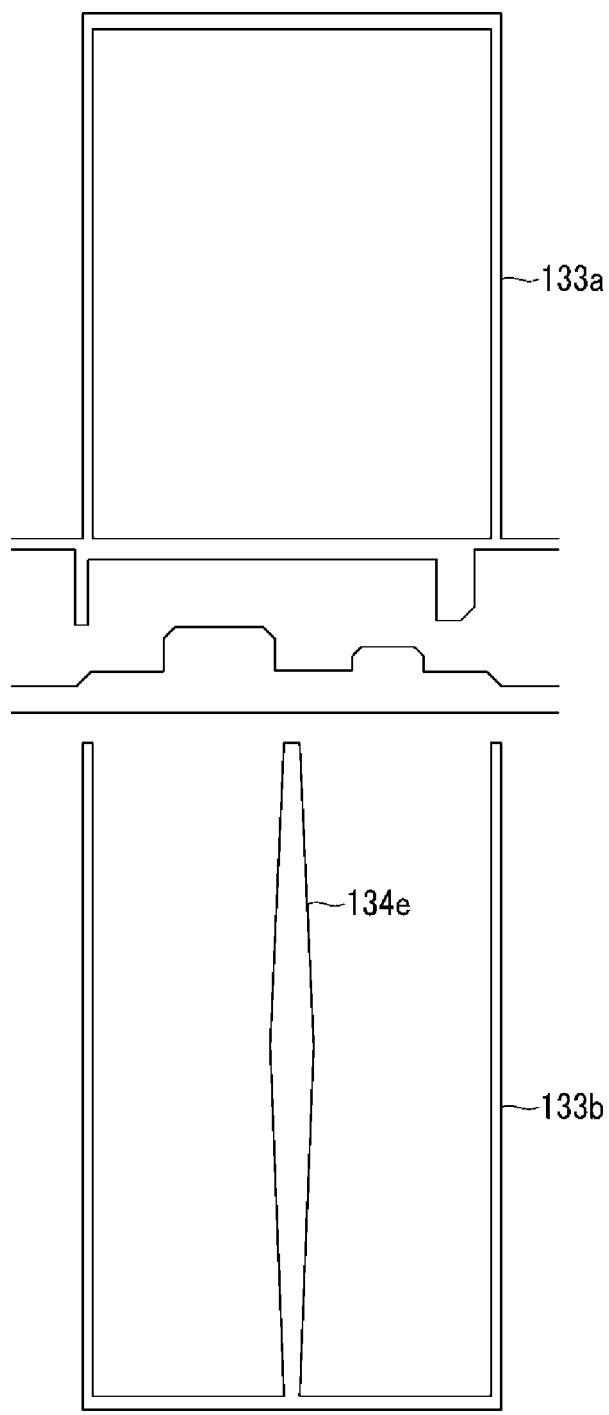
FIG. 15 is a layout view of a gate conductor layer of a liquid crystal display of FIG. 14.

The liquid crystal display with reference to the FIG. 14 and the FIG. 15 further includes a seventh storage electrode 134e connected to the second storage electrode 133b, differently from the liquid crystal display according to the exemplary embodiment shown in FIG. 3 to FIG. 5.

The width of the seventh storage electrode 134e is gradually decreased from the center of the second pixel electrode 191b to the edge. The seventh storage electrode 134e overlaps the longitudinal portion of the cross stem of the second pixel electrode 191b, thereby forming an additional storage capacitor. Accordingly, the total storage capacitance of the second subpixel may be increased. Consequently, the increasing of the kickback voltage of the second pixel electrode 191b generated by the third switching element Qc electrically connected to the second pixel electrode 191b is prevented, and thereby the display quality deterioration according to the kickback voltage difference between the first pixel electrode 191a and the second pixel electrode 191b may be prevented.

Many characteristics of the liquid crystal display according to the exemplary embodiments shown in FIG. 3 to FIG. 5 may be applied to the liquid crystal display according to the exemplary embodiments of the present invention.

Next, a liquid crystal display according to exemplary embodiments of the present invention will be described with reference to FIG. 16 and FIG. 17. The liquid crystal display according to the exemplary embodiments of the present invention is similar to the liquid crystal display according to the exemplary embodiments shown in FIG. 3 to FIG. 5. The description of the similar constitutions is omitted to avoid unnecessarily obscuring the present invention.

Figure 16:
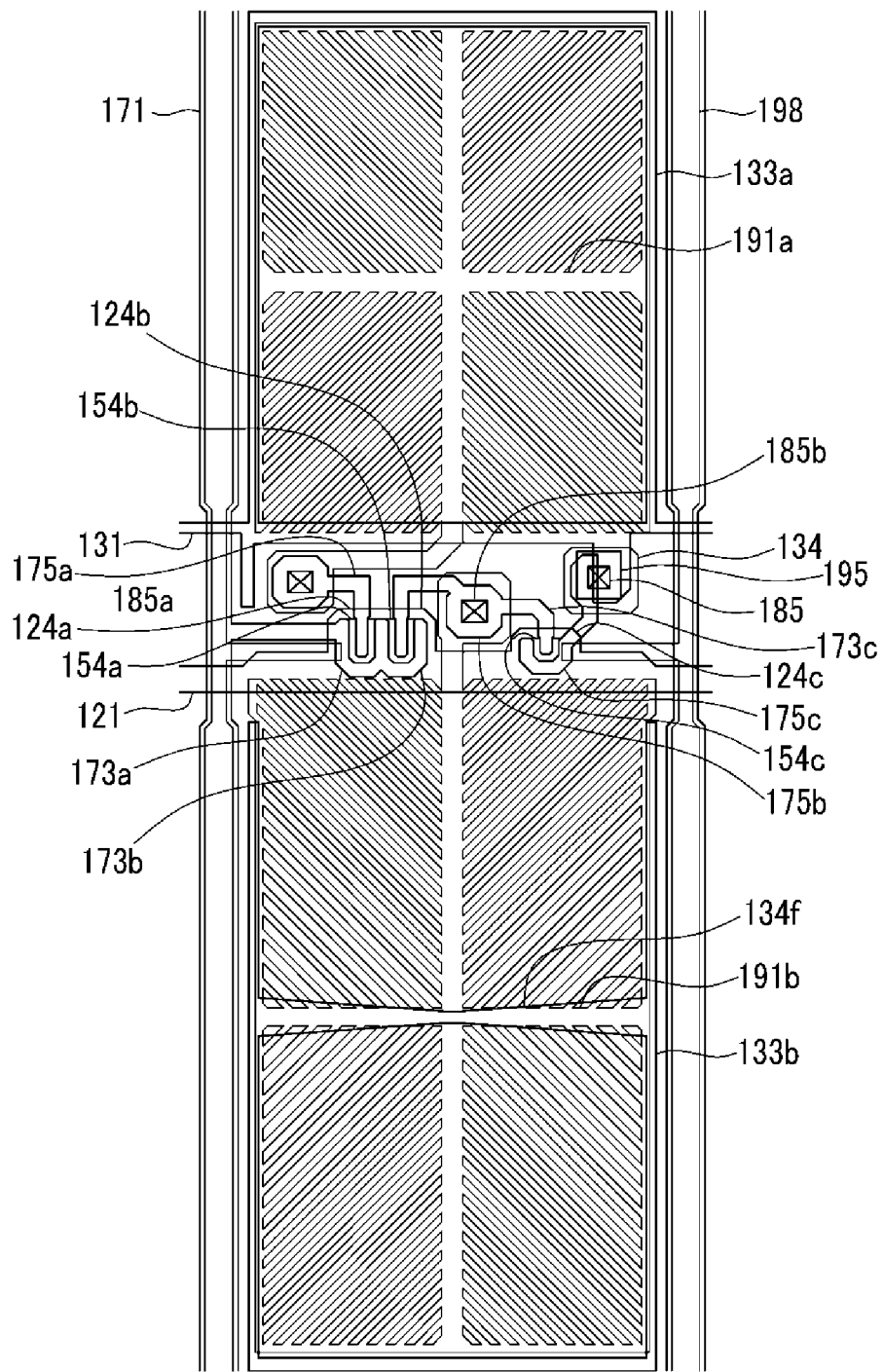
FIG. 16 is a layout view of an exemplary pixel of a liquid crystal display according to exemplary embodiments of the present invention.
Figure 17:
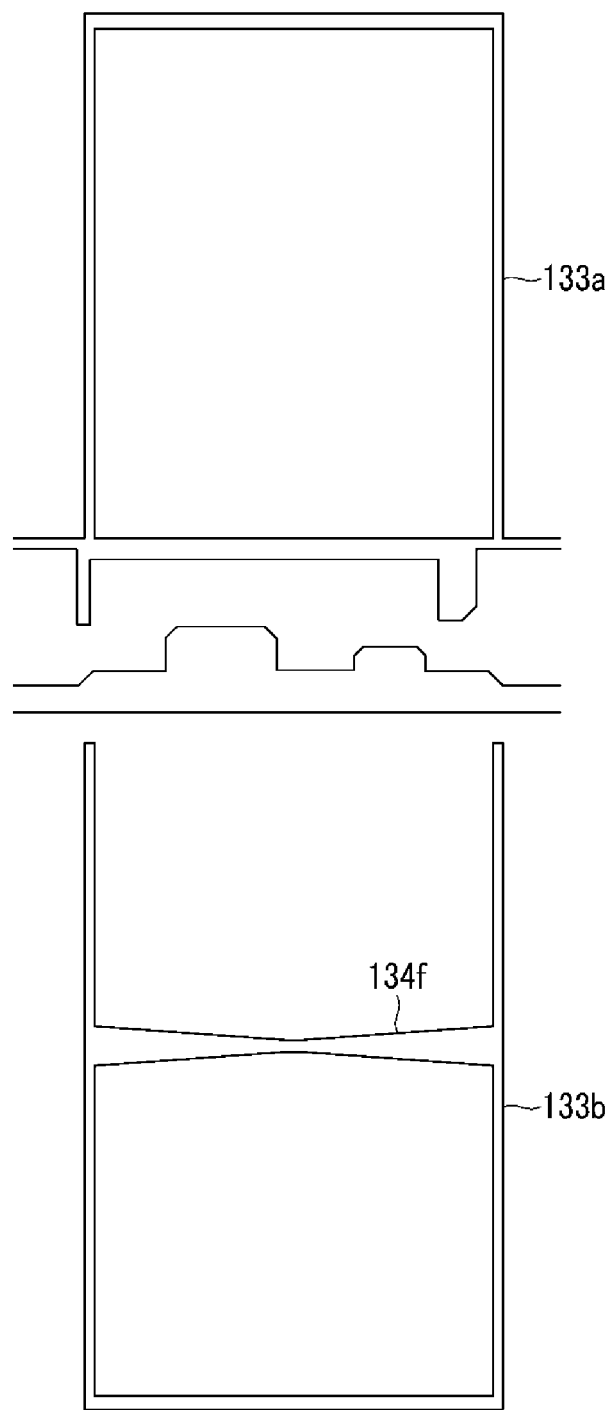
FIG. 17 is a layout view of a gate conductor layer of a liquid crystal display of FIG. 16.

The liquid crystal display with reference to the FIG. 16 and the FIG. 17 further includes an eighth storage electrode 134f connected to the second storage electrode 133b, differently from the liquid crystal display according to the exemplary embodiments shown in FIG. 3 to FIG. 5.

The width of the eighth storage electrode 134f is gradually increased from the center of the second pixel electrode 191b to the edge. The eighth storage electrode 134f overlaps the transverse portion of the cross stem of the second pixel electrode 191b, thereby forming an additional storage capacitor. Accordingly, the total storage capacitance of the second subpixel may be increased. Consequently, the increasing of the kickback voltage of the second pixel electrode 191b generated by the third switching element Qc electrically connected to the second pixel electrode 191b is prevented, and thereby the display quality deterioration according to the kickback voltage difference between the first pixel electrode 191a and the second pixel electrode 191b may be prevented.

Many characteristics of the liquid crystal display according to the exemplary embodiments shown in FIG. 3 to FIG. 5 may be applied to the liquid crystal display according to the exemplary embodiments of the present invention.

Next, a liquid crystal display according to exemplary embodiments of the present invention will be described with reference to FIG. 18 and FIG. 19. The liquid crystal display with reference to the FIG. 18 and the FIG. 19 is similar to the liquid crystal display according to the exemplary embodiments shown in FIG. 3 to FIG. 5. The description of similar constitutions is omitted to avoid unnecessarily obscuring the present invention.

Figure 18:
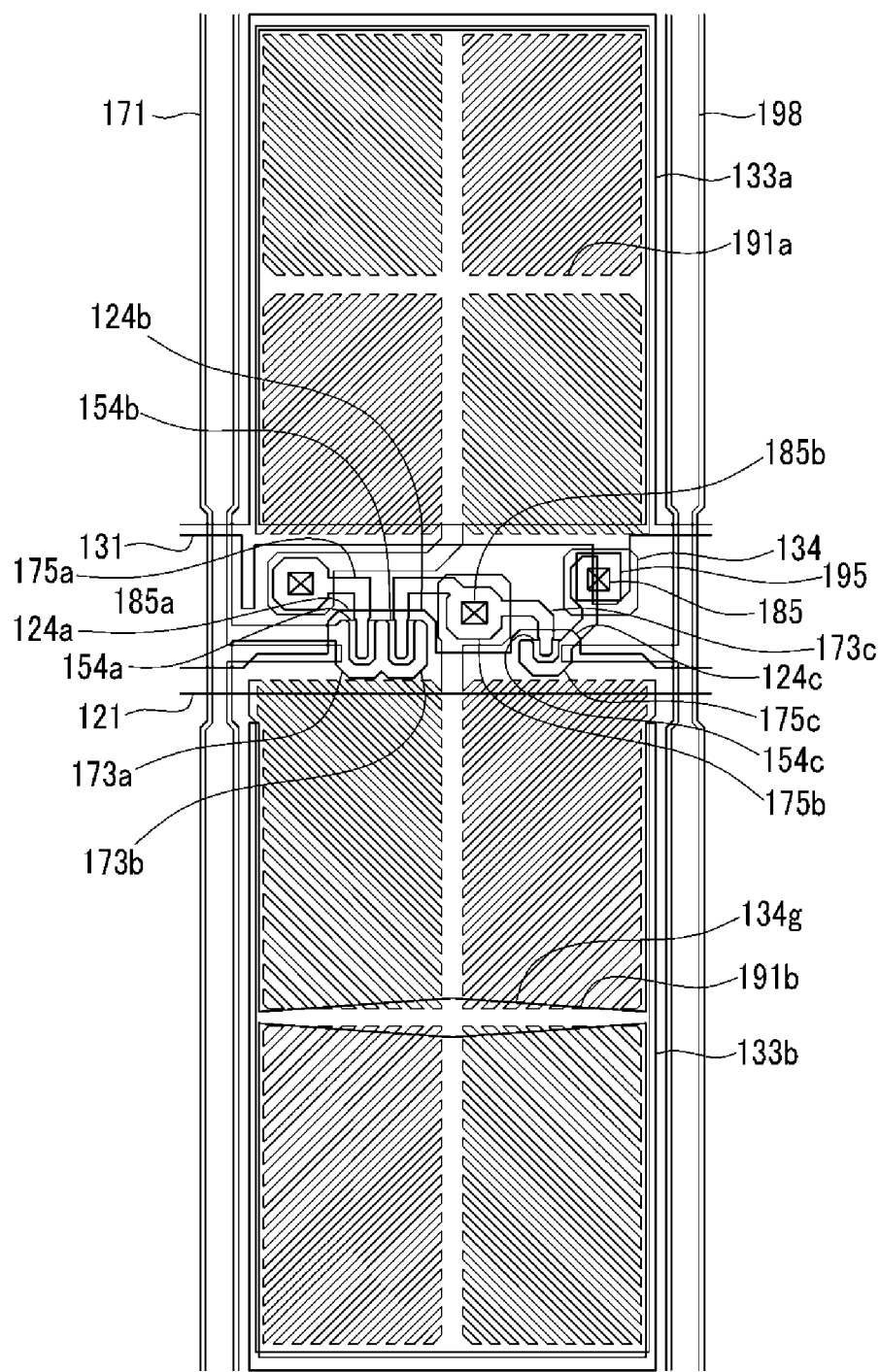
FIG. 18 is a layout view of an exemplary pixel of a liquid crystal display according to exemplary embodiments of the present invention.
Figure 19:
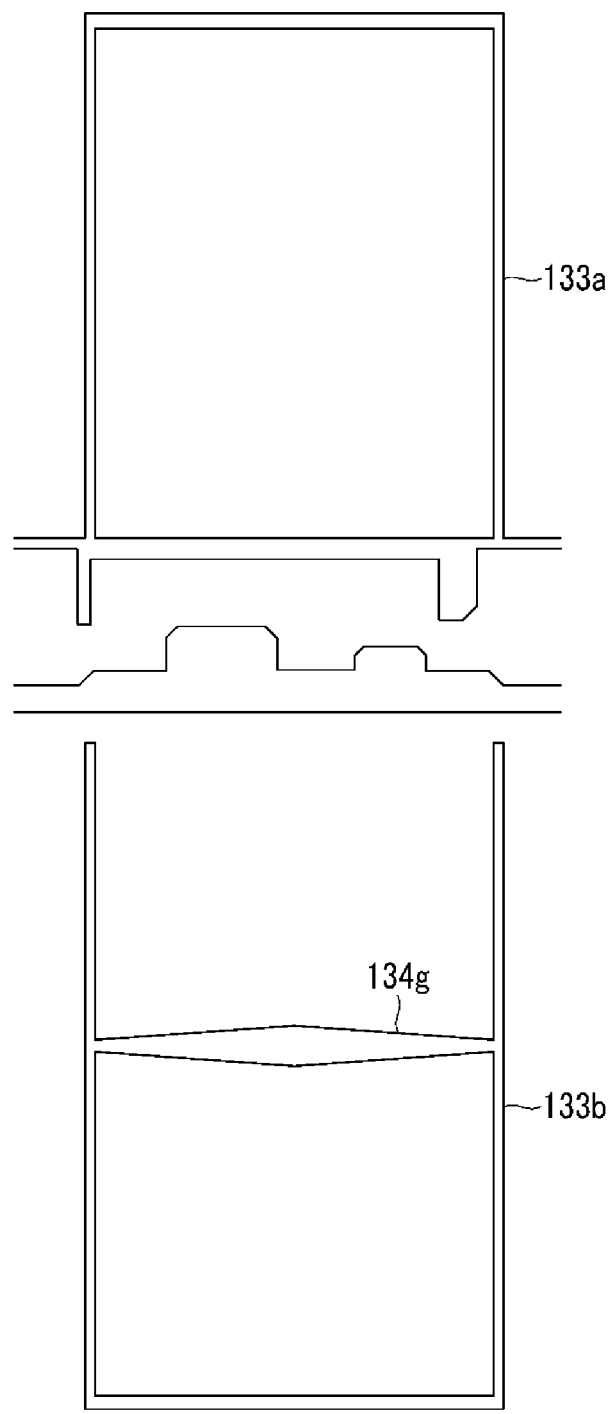
FIG. 19 a layout view of a gate conductor layer of a liquid crystal display of FIG. 18.

The liquid crystal display with reference to the FIG. 18 and the FIG. 19 further includes a ninth storage electrode 134g connected to the second storage electrode 133b, differently from the liquid crystal display according to the exemplary embodiments shown in FIG. 3 to FIG. 5.

The width of the ninth storage electrode 134g is gradually decreased from the center of the second pixel electrode 191b to the edge. The ninth storage electrode 134g overlaps the transverse portion of the cross stem of the second pixel electrode 191b, thereby forming an additional storage capacitor. Accordingly, the total storage capacitance of the second subpixel may be increased. Consequently, the increasing of the kickback voltage of the second pixel electrode 191b generated by the third switching element Qc electrically connected to the second pixel electrode 191b is prevented, and thereby the display quality deterioration according to the kickback voltage difference between the first pixel electrode 191a and the second pixel electrode 191b may be prevented.

Many characteristics of the liquid crystal display according to the exemplary embodiments shown in FIG. 3 to FIG. 5 may be applied to the liquid crystal display according to the present exemplary embodiment.

Figure 20:
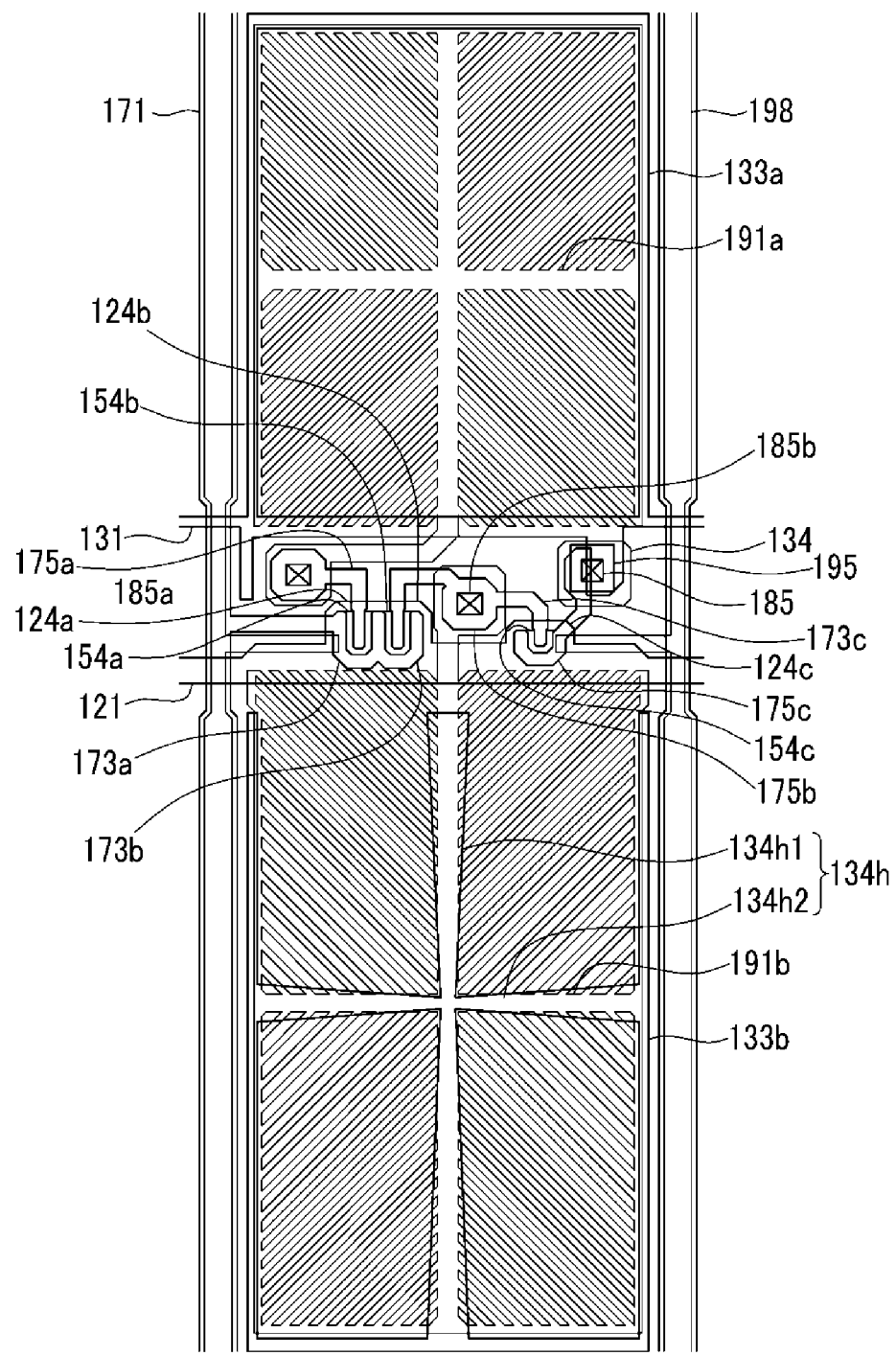
FIG. 20 is a layout view of an exemplary pixel of a liquid crystal display according to exemplary embodiments of the present invention.
Figure 21:
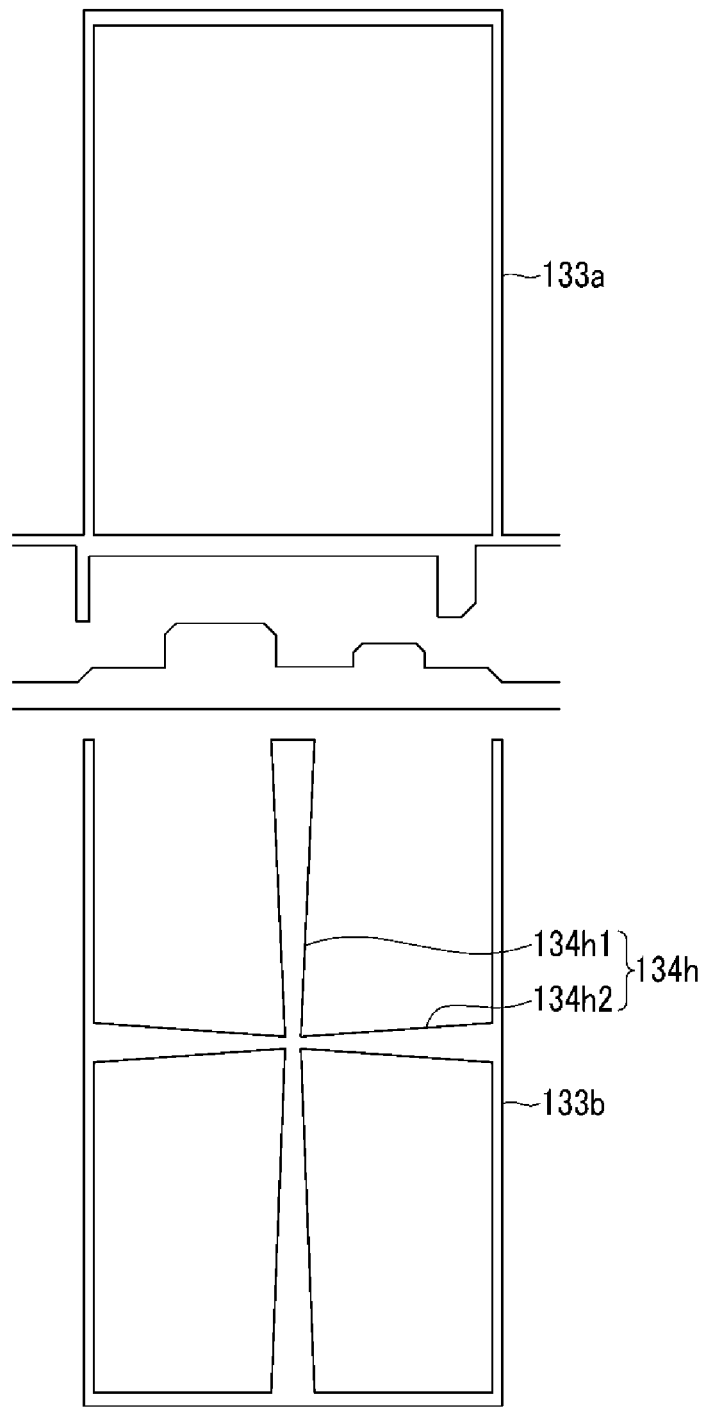
FIG. 21 is a layout view of a gate conductor layer of a liquid crystal display of FIG. 20.

Next, a liquid crystal display according to exemplary embodiments of the present invention will be described with reference to FIG. 20 and FIG. 21. The liquid crystal display with reference to FIG. 20 and FIG. 21 is similar to the liquid crystal display according to the exemplary embodiments shown in FIG. 3 to FIG. 5. The description of similar constitutions is omitted to avoid unnecessarily obscuring the present invention.

The liquid crystal display with reference to FIG. 20 and FIG. 21 further includes a tenth storage electrode 134h connected to the second storage electrode 133b, differently from the liquid crystal display according to the exemplary embodiments shown in FIG. 3 to FIG. 5.

The tenth storage electrode 134h overlaps the cross stem of the second pixel electrode 191b, and includes a first portion 134h1 overlapping the transverse portion of the cross stem of the second pixel electrode 191b and a second portion 134h2 overlapping the longitudinal portion of the cross stem of the second pixel electrode 191b. The width of the tenth storage electrode 134h is gradually increased from the center of the second pixel electrode 191b to the edge. The tenth storage electrode 134h overlaps the cross stem of the second pixel electrode 191b, thereby forming an additional storage capacitor. Accordingly, the total storage capacitance of the second subpixel may be increased. Consequently, the increasing of the kickback voltage of the second pixel electrode 191b generated by the third switching element Qc electrically connected to the second pixel electrode 191b is prevented, and thereby the display quality deterioration according to the kickback voltage difference between the first pixel electrode 191a and the second pixel electrode 191b may be prevented.

Many characteristics of the liquid crystal display according to the exemplary embodiments shown in FIG. 3 to FIG. 5 may be applied to the liquid crystal display according to the exemplary embodiments of the present invention.

Figure 22:
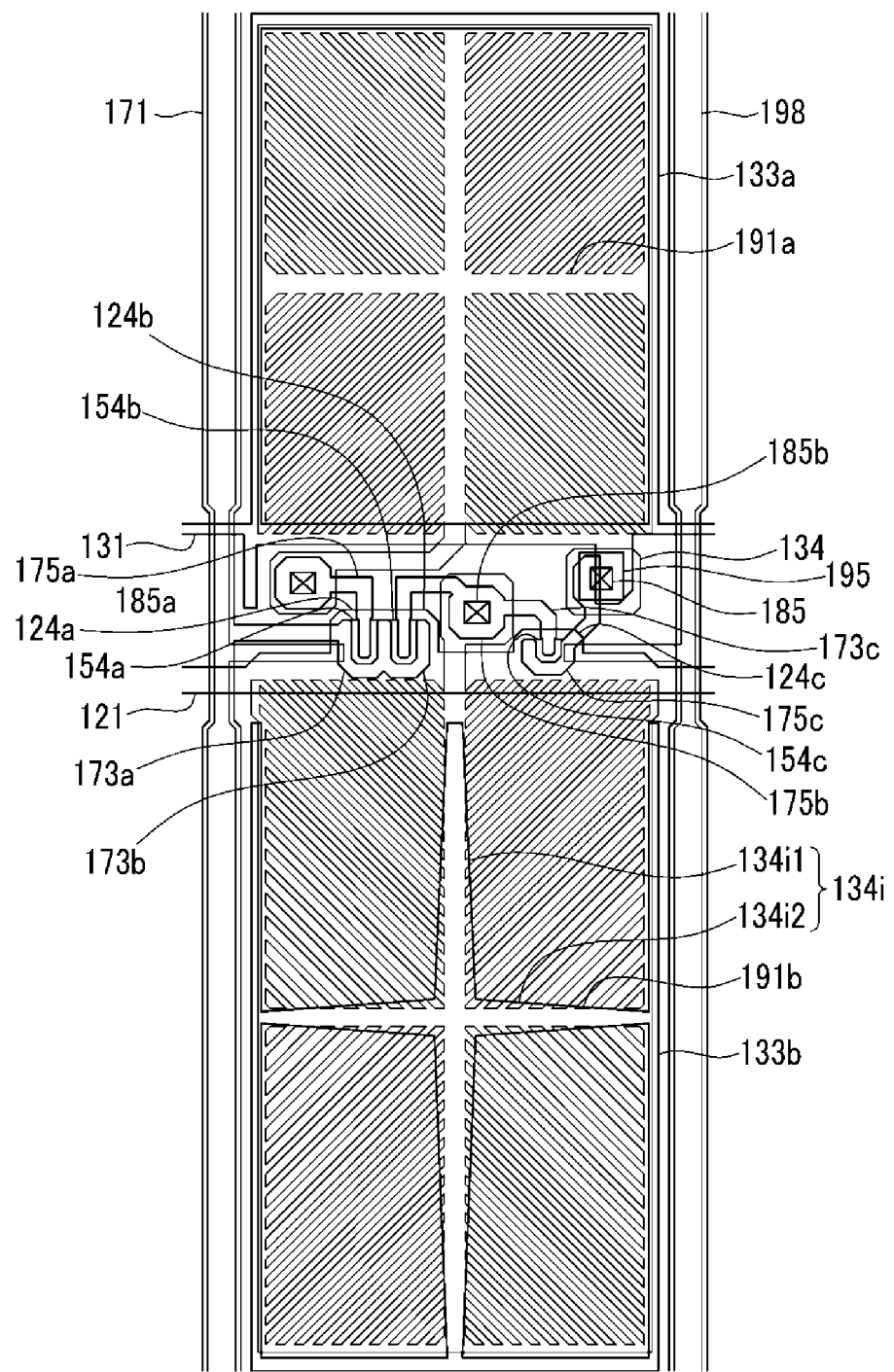
FIG. 22 is a layout view of an exemplary pixel of a liquid crystal display according to exemplary embodiments of the present invention.
Figure 23:
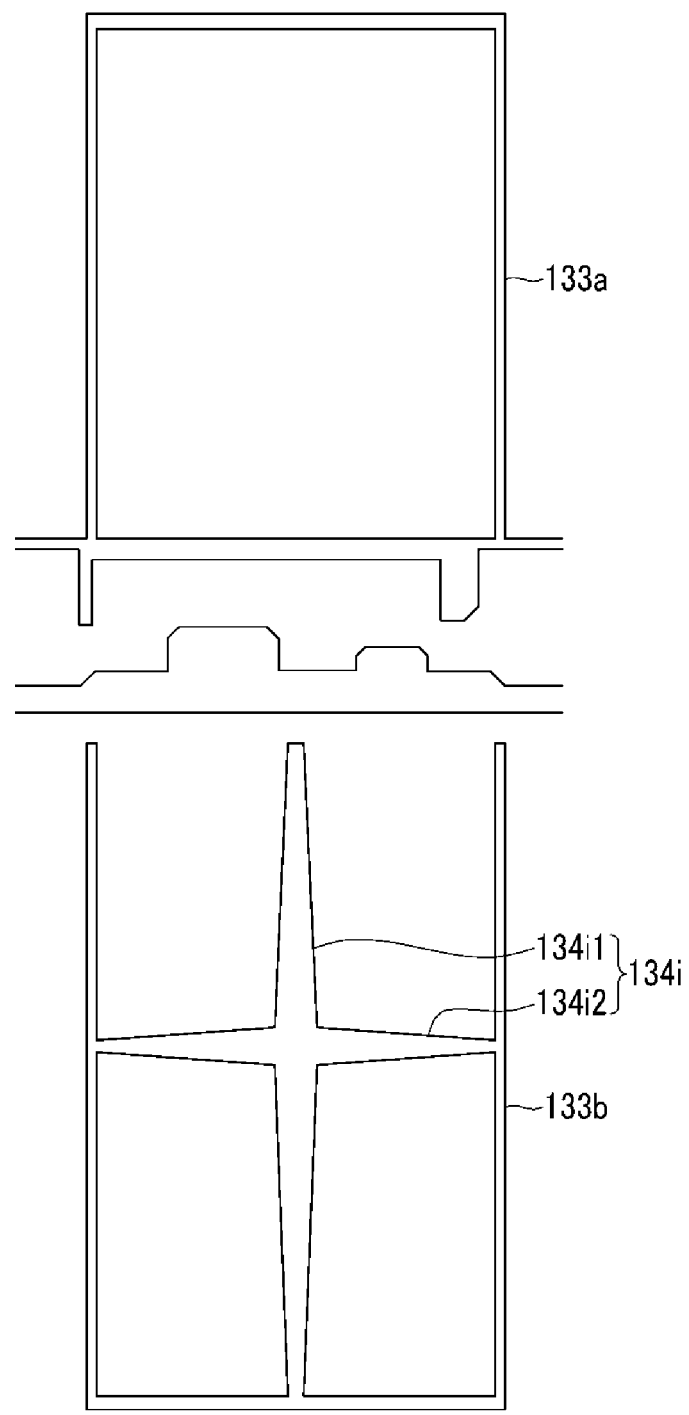
FIG. 23 is a layout view of a gate conductor layer of a liquid crystal display of FIG. 22.

Next, a liquid crystal display according to exemplary embodiments of the present invention will be described with reference to FIG. 22 and FIG. 23. The liquid crystal display with reference to FIG. 22 and FIG. 23 is similar to the liquid crystal display according to the exemplary embodiments shown in FIG. 3 to FIG. 5. The description of similar constitutions is omitted to avoid unnecessarily obscuring the present invention.

The liquid crystal display with reference to FIG. 22 and FIG. 23 further includes an eleventh storage electrode 134i connected to the second storage electrode 133b, differently from the liquid crystal display according to the exemplary embodiments shown in FIG. 3 to FIG. 5.

The eleventh storage electrode 134i overlaps the cross stem of the second pixel electrode 191b, and includes a first portion 134i1 overlapping the transverse portion of the cross stem of the second pixel electrode 191b and a second portion 134i2 overlapping the longitudinal portion of the cross stem of the second pixel electrode 191b. The width of the eleventh storage electrode 134i is gradually decreased from the center of the second pixel electrode 191b to the edge. The eleventh storage electrode 134i overlaps the cross stem of the second pixel electrode 191b, thereby forming an additional storage capacitor. Accordingly, the total storage capacitance of the second subpixel may be increased. Consequently, the increasing of the kickback voltage of the second pixel electrode 191b generated by the third switching element Qc electrically connected to the second pixel electrode 191b is prevented, and thereby the display quality deterioration according to the kickback voltage difference between the first pixel electrode 191a and the second pixel electrode 191b may be prevented.

Many characteristics of the liquid crystal display according to the exemplary embodiments shown in FIG. 3 to FIG. 5 may be applied to the liquid crystal display according to the exemplary embodiments of the present invention.

According to the exemplary embodiments of the present invention, an additional storage capacitor is formed to the subpixel electrode connected to the dividing switching element, thereby increasing the total storage capacitance. Due to the increasing of the total storage capacitance, the kickback voltage difference between two subpixels that may be generated by the additional dividing switching element is removed such that the display quality deterioration according to the kickback voltage difference between the two subpixels may be prevented.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display comprising:
a first substrate and a second substrate facing each other;
a liquid crystal layer, interposed between the first substrate and the second substrate, comprising liquid crystal molecules;
a gate line disposed on the first substrate;
a storage electrode disposed on the first substrate;
a data line disposed on the first substrate;
a first thin film transistor and a second thin film transistor connected to the gate line and the data line;
a third thin film transistor connected to the gate line and the second thin film transistor; and
a pixel electrode comprising a first pixel electrode connected to the first thin film transistor and a second pixel electrode connected to the second thin film transistor,
wherein an output electrode of the second thin film transistor comprises an expansion, and the expansion overlaps a portion of the storage electrode thereby forming a storage capacitor.

2. The liquid crystal display of claim 1, wherein
the first pixel electrode and the second pixel electrode each comprise a cross stem comprising a transverse stem and a longitudinal stem intersecting the transverse stem, and
a plurality of minute branches extending from the cross stem.

3. The liquid crystal display of claim 2, wherein
the storage electrode comprises a first storage electrode overlapping a portion of the first pixel electrode and a second storage electrode overlapping a portion of the second pixel electrode.

4. The liquid crystal display of claim 3, wherein
the second storage electrode comprises a third storage electrode overlapping the transverse stem of the second pixel electrode, the longitudinal stem of the second pixel electrode, or both the transverse stem and the longitudinal stem of the second pixel electrode.

5. The liquid crystal display of claim 4, wherein
the width of the third storage electrode is not uniform.

6. The liquid crystal display of claim 5, wherein
the width of the third storage electrode gradually increases from the center of the second pixel electrode to the edge of the second pixel electrode.

7. The liquid crystal display of claim 5, wherein
the width of the third storage electrode gradually decreases from the center of the second pixel electrode to the edge of the second pixel electrode.

8. The liquid crystal display of claim 4, wherein
the first pixel electrode and the second pixel electrode each comprise a plurality of sub-regions where a plurality of minute branches extend from the cross stem in different directions.

9. The liquid crystal display of claim 4, further comprising a shielding electrode overlapping the data line, wherein
the width of the shielding electrode is narrower than the width of the data line.

10. The liquid crystal display of claim 9, wherein
the shielding electrode is configured to receive a voltage having the same magnitude as the voltage received by the drain electrode of the third thin film transistor.

11. The liquid crystal display of claim 9, wherein
the first pixel electrode and the second pixel electrode each comprise a plurality of sub-regions where a plurality of minute branches extend from the cross stem in different directions.

12. The liquid crystal display of claim 1, further comprising:
a shielding electrode overlapping the data line, wherein
the width of the shielding electrode is narrower than the width of the data line.

13. A liquid crystal display comprising:
a first substrate and a second substrate facing each other;
a liquid crystal layer, interposed between the first substrate and the second substrate, comprising liquid crystal molecules;
a gate line disposed on the first substrate;
a storage electrode disposed on the first substrate;
a data line disposed on the first substrate;
a first thin film transistor and a second thin film transistor connected to the gate line and the data line;
a third thin film transistor connected to the gate line and the second thin film transistor; and
a pixel electrode comprising a first pixel electrode connected to the first thin film transistor and a second pixel electrode connected to the second thin film transistor,
wherein the first pixel electrode and the second pixel electrode each comprise a cross stem comprising a transverse stem and a longitudinal stem intersecting the transverse stem and
a plurality of minute branches extending from the cross stem,
the storage electrode comprises a first storage electrode overlapping a portion of the first pixel electrode and a second storage electrode overlapping a portion of the second pixel electrode, and
the second storage electrode comprises a third storage electrode overlapping the transverse stem of the second pixel electrode, the longitudinal stem of the second pixel electrode, or both the transverse stem of the second pixel electrode, the longitudinal stem of the second pixel electrode.

14. The liquid crystal display of claim 13, wherein
the width of the third storage electrode is not uniform.

15. The liquid crystal display of claim 14, wherein
the width of the third storage electrode gradually increases from the center of the second pixel electrode to the edge of the second pixel electrode.

16. The liquid crystal display of claim 14, wherein
the width of the third storage electrode gradually decreases from the center of the second pixel electrode to the edge of the second pixel electrode.

17. The liquid crystal display of claim 13, wherein
the first pixel electrode and the second pixel electrode comprise a plurality of sub-regions where a plurality of minute branches extend from the cross stem in different directions.

18. The liquid crystal display of claim 13, further comprising:
a shielding electrode overlapping the data line, and
the width of the shielding electrode is narrower than the width of the data line.

19. The liquid crystal display of claim 18, wherein
the shielding electrode is configured to receive a voltage having the same magnitude as the voltage received by the drain electrode of the third thin film transistor.

* * * * *